United States Patent [19]
Ogawa et al.

[11] Patent Number: 6,055,383
[45] Date of Patent: *Apr. 25, 2000

[54] FILM-CARTRIDGE LOADING DEVICE FOR A CAMERA USING A FILM-CARTRIDGE HAVING A MOVABLE LIGHT-BLOCKING DOOR

[75] Inventors: Yukio Ogawa; Hidetoshi Masuda, both of Yokohama, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/763,446

[22] Filed: Dec. 11, 1996

Related U.S. Application Data

[63] Continuation of application No. 08/337,380, Nov. 8, 1994, abandoned.

[30] Foreign Application Priority Data

Nov. 17, 1993 [JP] Japan ................................... 5-309708
Dec. 28, 1993 [JP] Japan ................................... 5-336705

[51] Int. Cl.[7] ................................................ G03B 17/02
[52] U.S. Cl. .......................................................... 396/538
[58] Field of Search .................................. 396/512, 513, 396/535, 536, 538; 360/96.5, 93

[56] References Cited

U.S. PATENT DOCUMENTS

| | | | |
|---|---|---|---|
| 4,933,790 | 6/1990 | Mitumaru | 360/96.5 |
| 4,982,212 | 1/1991 | Alyfuku | 354/173.1 |
| 5,065,264 | 11/1991 | Ohmori et al. | 360/96.5 |
| 5,150,264 | 9/1992 | Nakabayashi | 360/71 |
| 5,159,365 | 10/1992 | Takahashi et al. | 354/275 |
| 5,231,438 | 7/1993 | Sowart | 351/288 |
| 5,317,356 | 5/1994 | Dassuno | 354/288 |
| 5,319,406 | 6/1994 | Takatori | 354/275 |
| 5,319,407 | 6/1994 | DiRisio | 391/275 |
| 5,363,166 | 11/1994 | Takahashi et al. | 354/275 |
| 5,629,818 | 5/1997 | Schandl et al. | 360/96.5 |
| 5,664,249 | 9/1997 | Okuno et al. | 396/538 |

FOREIGN PATENT DOCUMENTS 1-191837 8/1989 Japan.
480735 of 1992 Japan.

*Primary Examiner*—Safet Metjahic
*Assistant Examiner*—Michael Dalakis
*Attorney, Agent, or Firm*—Fitzpatrick, Cella, Harper & Scinto

[57] ABSTRACT

A camera adapted to use an image record image medium cartridge having a cover for allowing an image recording medium to exit from or withdraw into the cartridge, the camera including a cartridge chamber cover for allowing at least one of loading and unloading of the cartridge relative to the camera, and a moving device for performing at least one of closing the cartridge chamber cover while moving a predetermined interval and opening the cover of the cartridge after moving the predetermined interval, and closing the cover of the cartridge while moving a predetermined interval and opening the cartridge chamber cover after moving the predetermined interval.

78 Claims, 25 Drawing Sheets

6,055,383

FILM-CARTRIDGE LOADING DEVICE FOR A CAMERA USING A FILM-CARTRIDGE HAVING A MOVABLE LIGHT-BLOCKING DOOR

This application is a continuation of application Ser. No. 08/337,380, filed Nov. 8, 1994, now abandoned.

BACKGROUND OF THE INVENTION

1. Field of the Invention

This invention relates to a film-cartridge loading device for a camera which is suitable for loading a film cartridge having a movable light-blocking door.

2. Description of the Related Art

Recently, a so-called "thrust-type cartridge film", whose leader portion is completely accommodated within a cartridge and is taken out by a film-feeding operation of a camera, has been proposed.

A film entrance of the cartridge is blocked from light by a openable/closable light-blocking door.

When using a cartridge of this type, unless the light-blocking door of the cartridge is opened only after the cartridge has been loaded in a cartridge-loading chamber of a camera and a cover of the catridge-loading chamber has been completely closed, and unless the cover of the cartridge-loading chamber is opened only after the light-blocking door of the cartridge has been completely closed, light enters the cartridge through the film entrance, so that the film inside the cartridge is exposed to light and therefore becomes unusable.

SUMMARY OF THE INVENTION

According to one aspect of the present invention, the present invention relates to a camera adapted to use an image recording medium cartridge having a cover for allowing an image recording medium to exit from or withdraw into the cartridge, said camera comprising a cartridge chamber cover for allowing at least one of loading and unloading of the cartridge relative to said camera, and moving means for performing at least one of closing said cartridge chamber cover while moving a predetermined interval and opening the cover of the cartridge after moving the predetermined interval, and closing the cover of the cartridge while moving a predetermined interval and opening said cartridge chamber cover after moving the predetermined interval.

According to another aspect of the present invention, the present invention relates to a camera adapted to use an image recording medium cartridge having a cover for allowing an image recording medium to exit from or withdraw into the cartridge, said camera comprising a cartridge chamber cover for allowing at least one of loading and unloading of the cartridge relative to said camera, and driving means for driving said cartridge chamber cover and the cover of the cartridge.

According to yet another aspect of the present invention, the present invention relates to a cartridge receiving apparatus adapted to use an image recording medium cartridge having a cover for allowing an image recording medium to exit from or withdraw into the cartridge, said cartridge receiving apparatus comprising a cartridge chamber cover for allowing at least one of loading and unloading of the cartridge relative to said cartridge receiving apparatus, and moving means for performing at least one of closing said cartridge chamber cover while moving a predetermined interval and opening the cover of the cartridge after moving the predetermined interval, and closing the cover of the cartridge while moving a predetermined interval and opening said cartridge chamber cover after moving the predetermined interval.

According to still another aspect of the present invention, the present invention relates to a cartridge receiving apparatus adapted to use an image recording medium cartridge having a cover for allowing an image recording medium to exit from or withdraw into the cartridge, said cartridge receiving apparatus comprising a cartridge chamber cover for allowing at least one of loading and unloading of the cartridge relative to said cartridge receiving apparatus, and driving means for driving said cartridge chamber cover and the cover of the cartridge.

According to yet another aspect of the present invention, the present invention relates to a cartridge receiving apparatus for use with one of a camera and another apparatus, each of the camera and the other apparatus being adapted to use an image recording medium cartridge having a cover for allowing an image recording medium to exit from or withdraw into the cartridge, said cartridge receiving apparatus comprising a cartridge chamber cover for allowing at least one of loading and unloading of the cartridge relative to said cartridge receiving apparatus, and moving means for performing at least one of closing said cartridge chamber cover while moving a predetermined interval and opening the cover of the cartridge after moving the predetermined interval, and closing the cover of the cartridge while moving a predetermined interval and opening said cartridge chamber cover after moving the predetermined interval.

According to yet another aspect of the present invention, the present invention relates to a cartridge receiving apparatus for use with one of a camera and another apparatus, each of the camera and the other apparatus being adapted to use an image recording medium cartridge having a cover for allowing an image recording medium to exit from or withdraw into the cartridge, said cartridge receiving apparatus comprising a cartridge chamber cover for allowing at least one of loading and unloading of the cartridge relative to said cartridge receiving apparatus, and driving means for driving said cartridge chamber cover and the cover of the cartridge.

According to yet another aspect of the present invention, the present invention relates to a camera adapted to use an image recording medium cartridge having a light sheild portion, said camera comprising a cartridge chamber cover for allowing at least one of loading and unloading of the cartridge relative to said camera, and moving means for performing at least one of closing said cartridge chamber cover while moving a predetermined interval and opening the light shield portion after moving the predetermined interval, and closing the light shield portion while moving a predetermined interval and opening said cartridge chamber cover after moving the predetermined interval.

According to yet another aspect of the present invention, the present invention relates to a camera adapted to use an image recording medium cartridge having a light shield portion, said camera comprising a cartridge chamber cover for allowing at least one of loading and unloading of the cartridge relative to said camera, and driving means for driving said cartridge chamber cover and the light shield portion.

According to yet another aspect of the present invention, the present invention relates to an apparatus adapted to use an image recording medium cartridge having a light sheild portion, said apparatus comprising a cartridge chamber cover for allowing at least one of loading and unloading of the cartridge relative to said apparatus, and moving means for performing at least one of closing said cartridge chamber cover while moving a predetermined interval and opening the light shield portion after moving the predetermined interval, and closing the light shield portion while moving a predetermined interval and opening said cartridge chamber cover after moving the predetermined interval.

According to yet another aspect of the present invention, the present invention relates to an apparatus adapted to use an image recording medium cartridge having a light shield portion, said apparatus comprising a cartridge chamber cover for allowing at least one of loading and unloading of the cartridge relative to said apparatus, and driving means for driving said cartridge chamber cover and the light shield portion.

According to yet another aspect of the present invention, the present invention relates to a cartridge receiving apparatus for use with one of a camera and another apparatus, each of the camera and the other apparatus being adapted to use an image recording medium cartridge having a light shield portion, said cartridge receiving apparatus comprising a cartridge chamber cover for allowing at least one of loading and unloading of the cartridge relative to said cartridge receiving apparatus, and moving means for performing at least one of closing said cartridge chamber cover while moving a predetermined interval and opening the light shield portion after moving the predetermined interval, and closing the light shield portion while moving a predetermined interval and opening said cartridge chamber cover after moving the predetermined interval.

According to yet another aspect of the present invention, the present invention relates to a cartridge receiving apparatus for use with one of a camera and another apparatus, each of the camera and the other apparatus being adapted to use an image recording medium cartridge having a light shield portion, said cartridge receiving apparatus comprising a cartridge chamber cover for allowing at least one of loading and unloading of the cartridge relative to said cartridge receiving apparatus, and driving means for driving said cartridge chamber cover and the light shield portion.

In view of the foregoing aspects, both the driving and the operation sequence of the opening and closing of each of the cartridge chamber cover and the cover of the cartridge can be appropriately performed.

The foregoing and other objects, advantages and features of the present invention will become more apparent from the following detailed description of the preferred embodiments taken in conjunction with the accompanying drawings.

DETAILED DESCRIPTION OF THE PREFERRED EMBODIMENTS

Preferred embodiments of the present invention will now be described with reference to the drawings.

Figure 1:
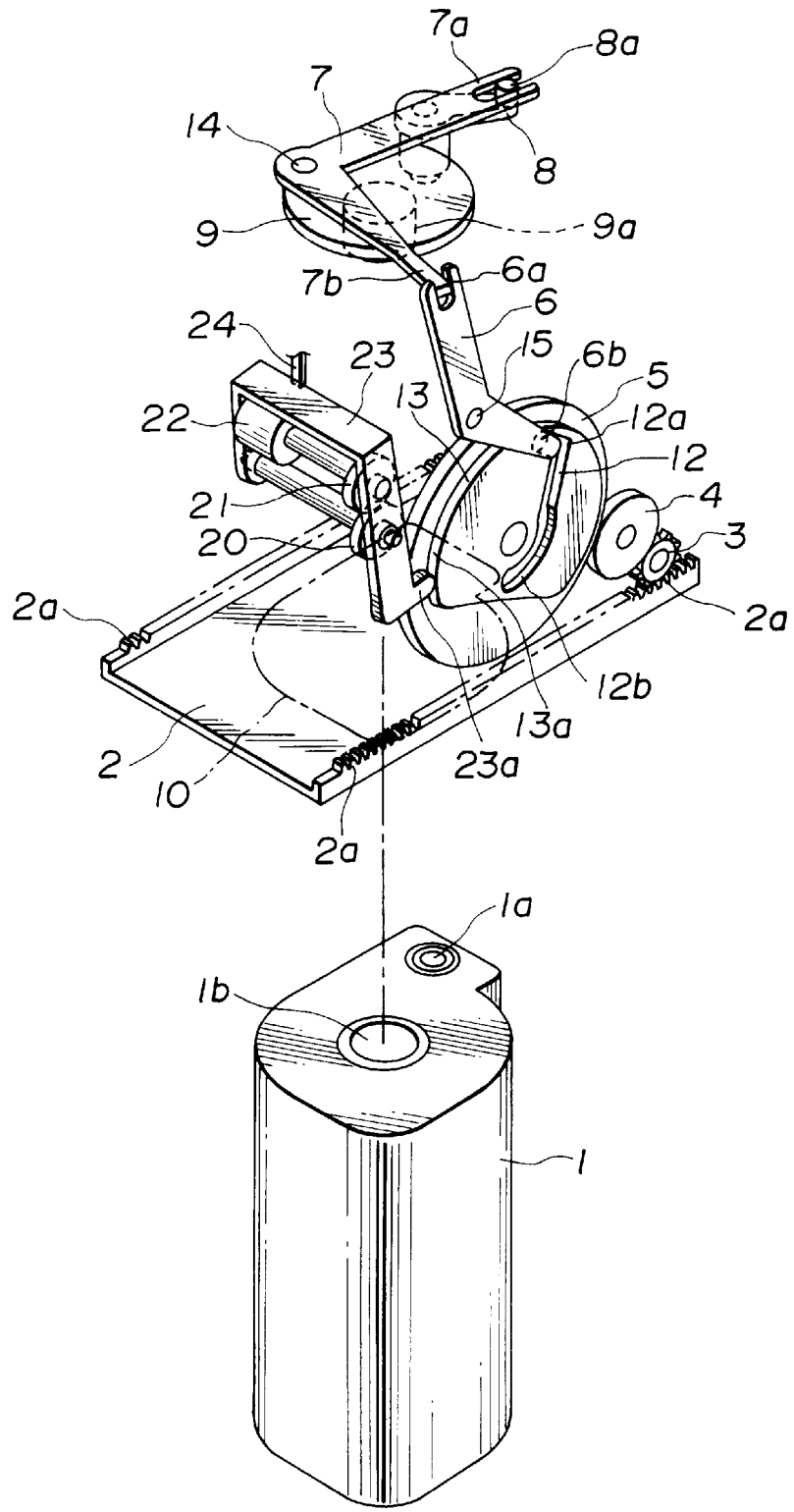
FIG. 1 is a perspective view illustrating a closed state of a cover of a cartridge loading chamber of a camera according to a first embodiment of the present invention.
Figure 2:
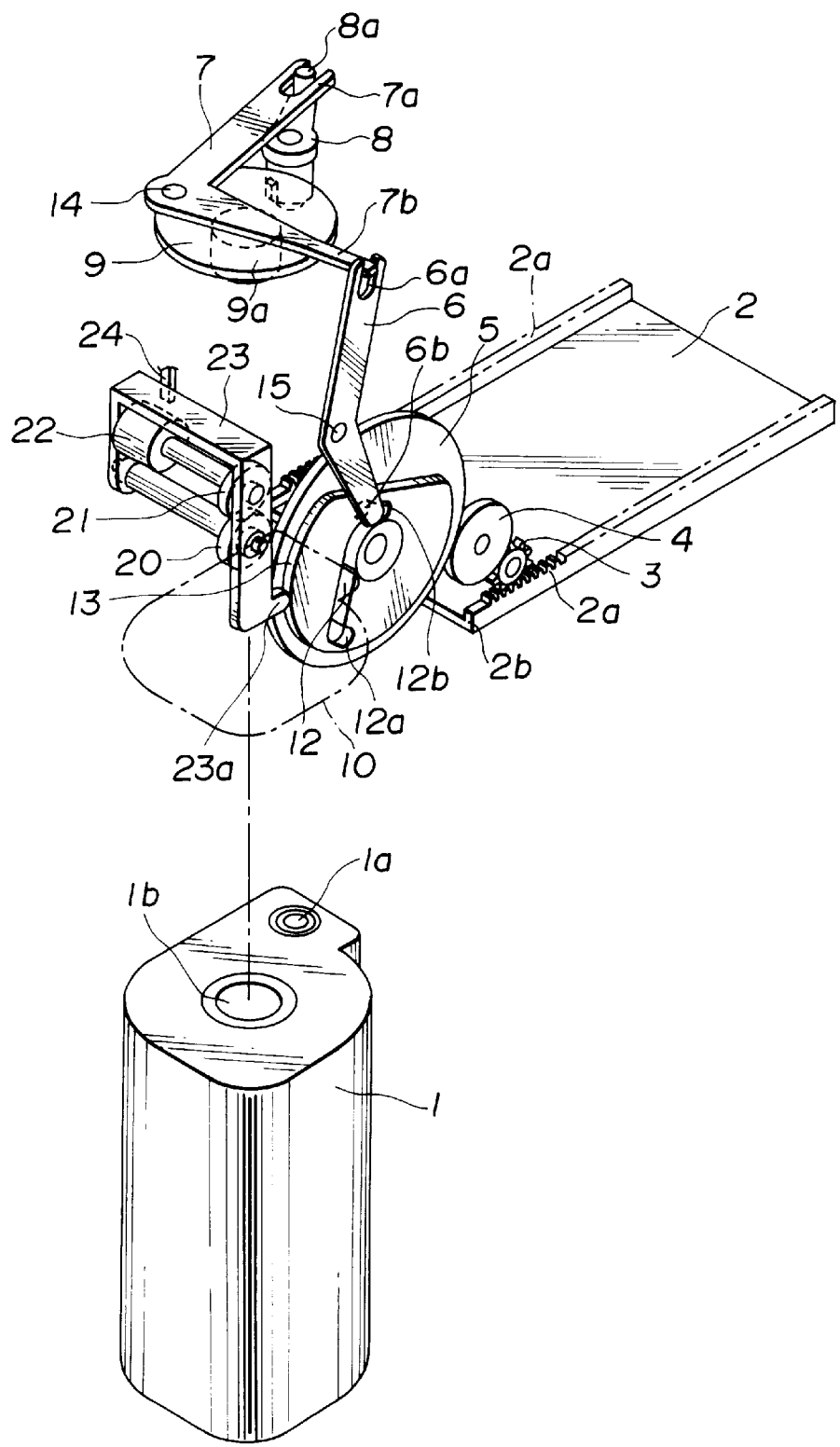
FIG. 2 is a perspective view illustrating an opened state of the cover of the cartridge loading chamber shown in FIG. 1.
Figure 3:
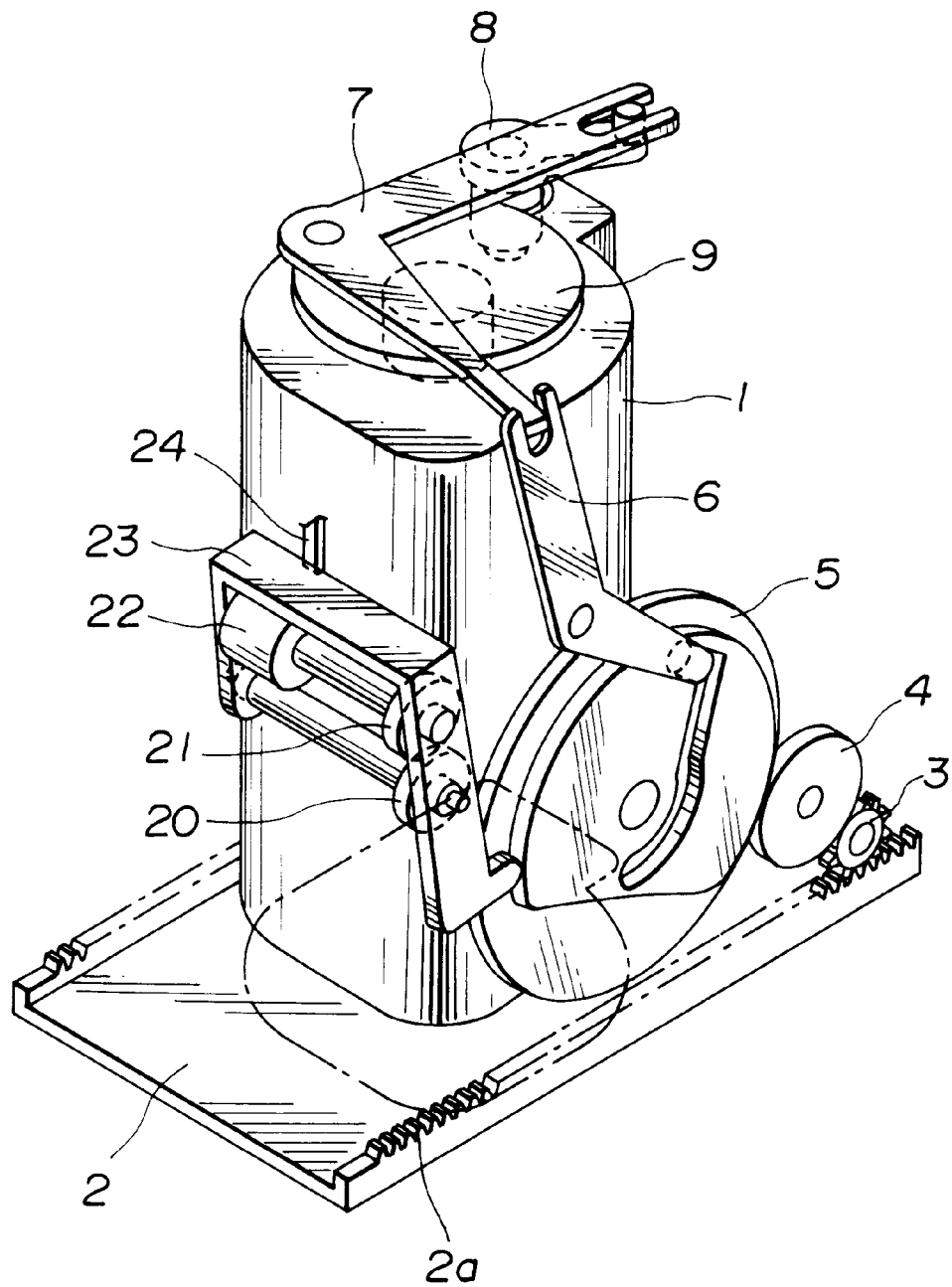
FIG. 3 is a perspective view illustrating a state in which a cartridge is loaded in the cartridge loading chamber shown in FIG. 1.
Figure 4:
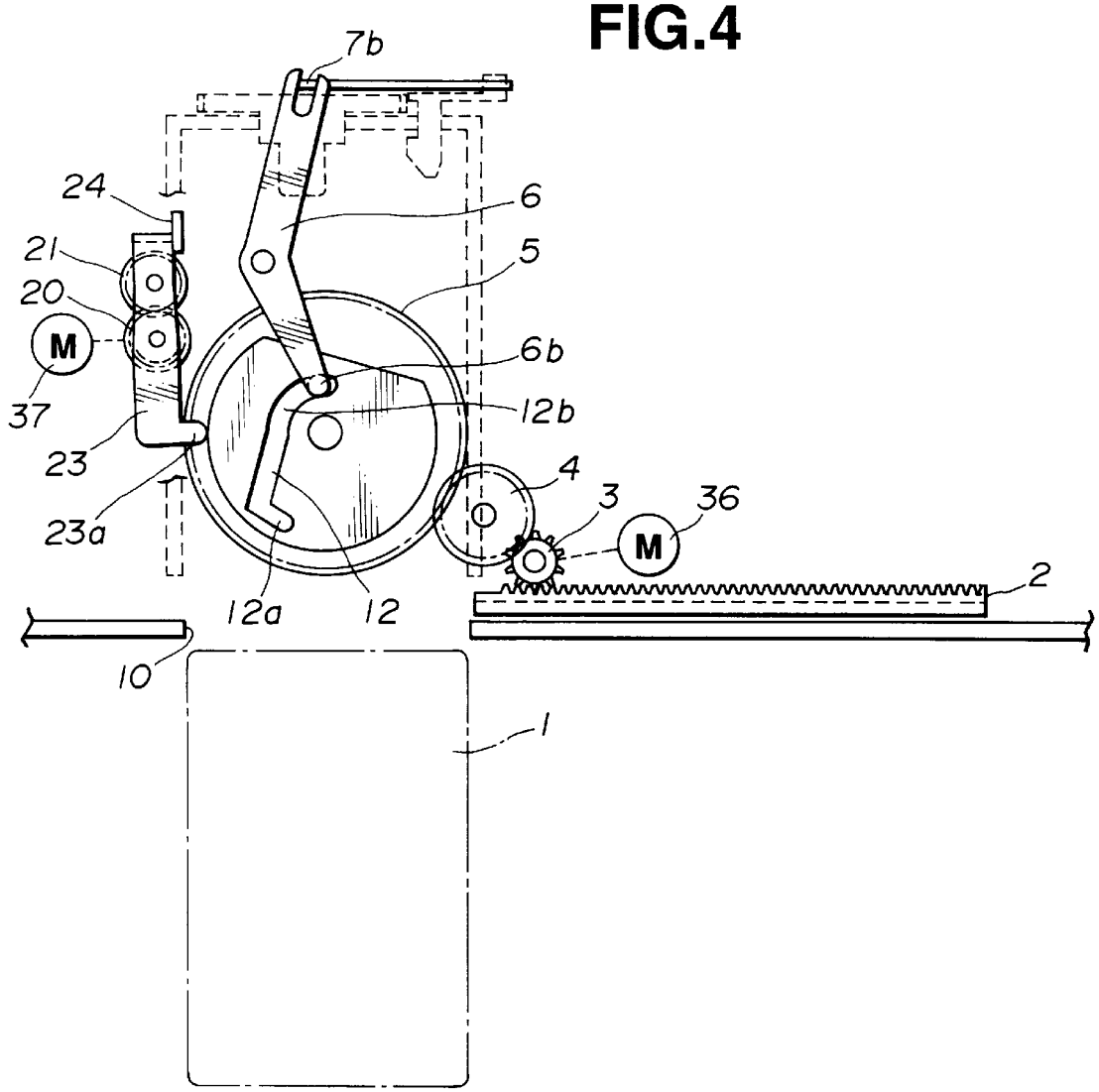
FIG. 4 is a schematic plan view of the state shown in FIG. 2.
Figure 5:
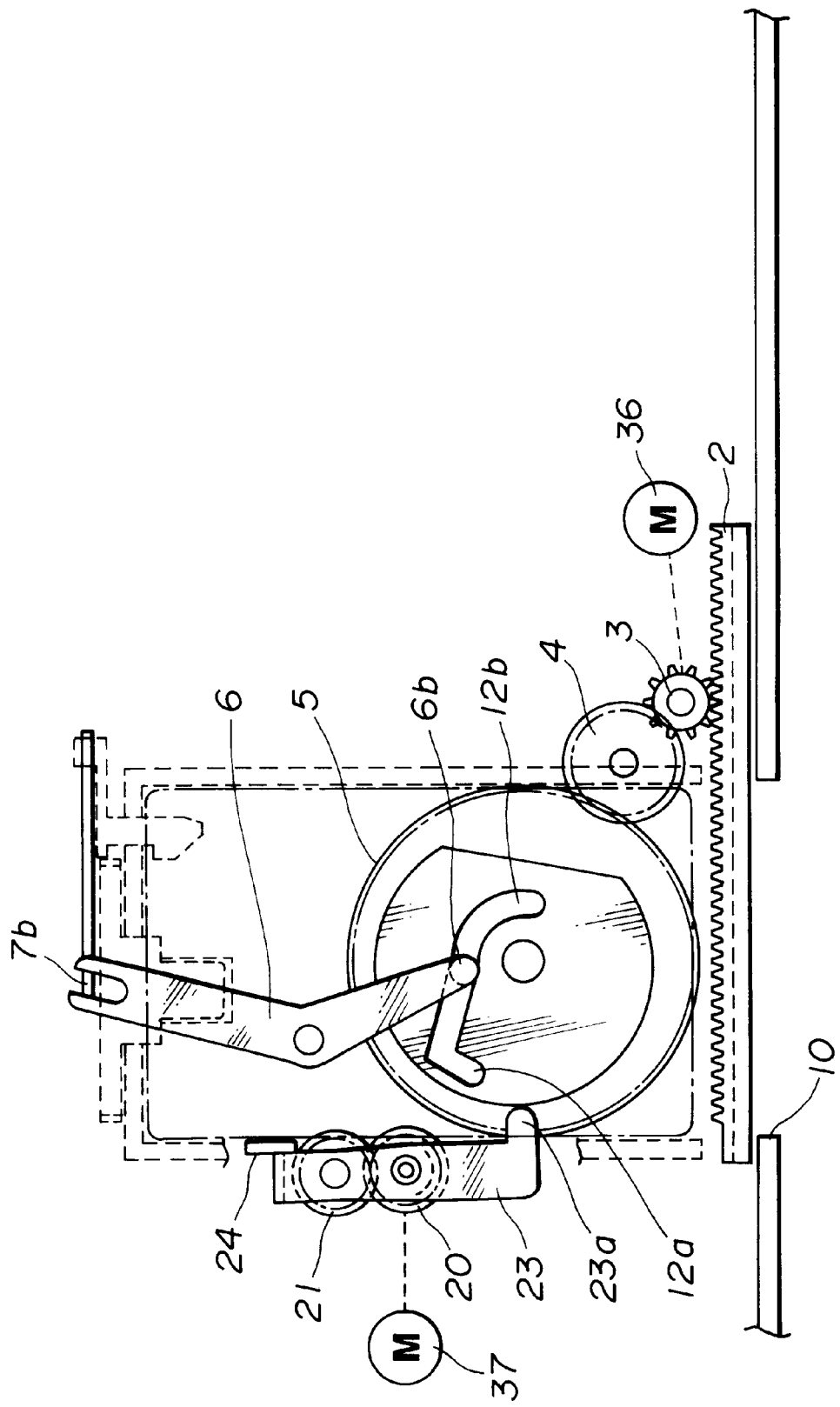
FIG. 5 is a schematic plan view illustrating a state during an opening/closing operation of the cover of the cartridge loading chamber of the first embodiment.
Figure 6:
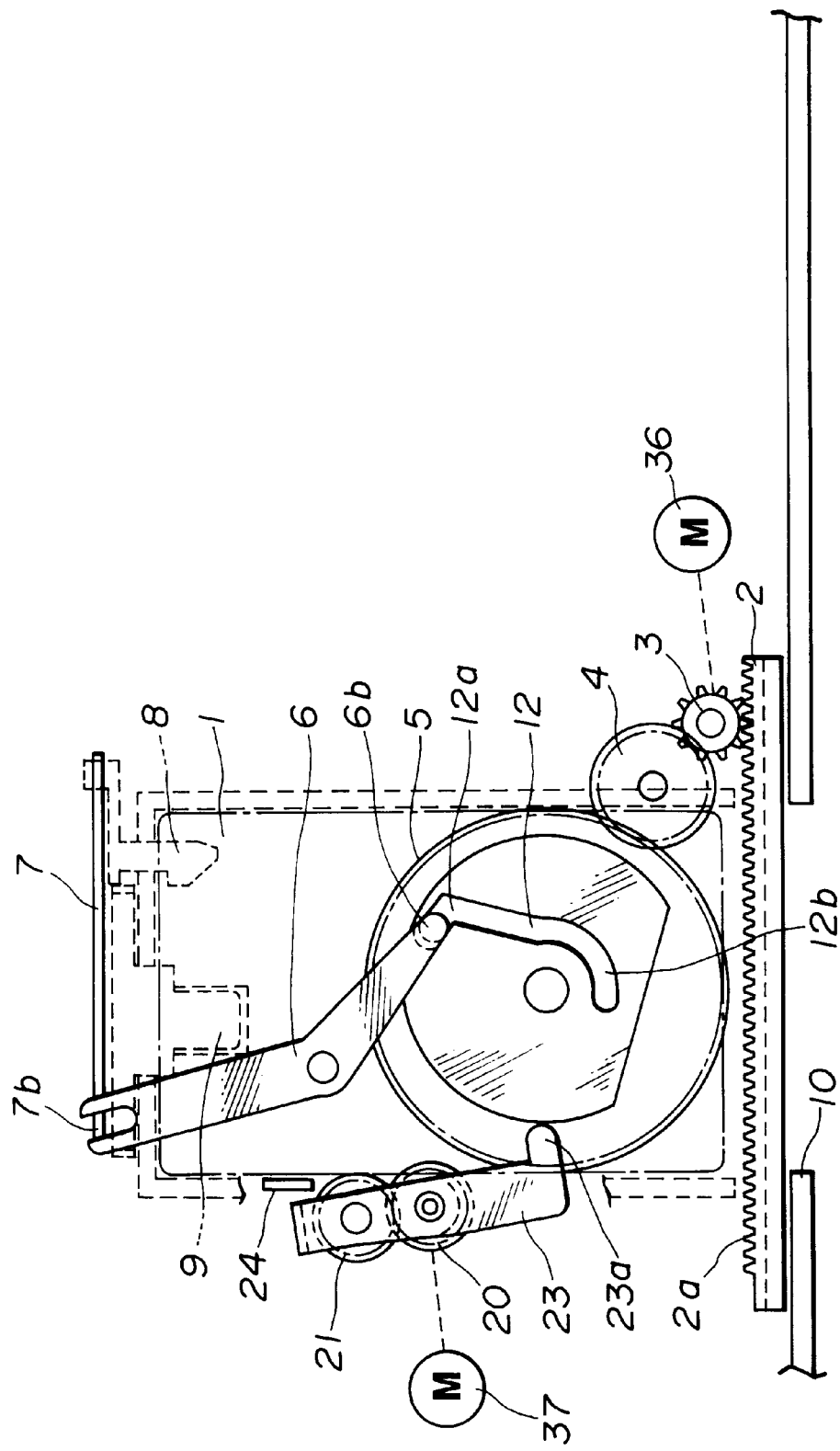
FIG. 6 is a schematic plan view of the state shown in FIG. 3.

FIGS. 1 through 3 are perspective views of a film-cartridge loading device of a camera according to a first embodiment of the present invention. FIGS. 4 through 6 are schematic plan views of the film-cartridge loading device. In FIGS. 1 through 6, reference numeral 10, indicated by one-dot chain lines, represents a film-cartridge loading entrance provided in the main body of the camera. Reference numeral 1 represents a film cartridge to be inserted into the entrance 10 from the axial direction (from below the camera). A cover 2 of a cartridge-loading chamber is held at the base of the camera so as to be slidable toward the right and the left within a plane orthogonal to the shaft of the cartridge 1, and has substantially a reverse C-shaped cross section. Rack portions 2a are provided at two ends of the cover 2.

While FIG. 1, and several other figures, for purposes of simplicity, depict rack portions 2a only at the leftmost and rightmost portions of the two ends of the cover 2, the rack portions 2a extend between the illustrated leftmost and rightmost portions along each of the two ends of the cover 2, as depicted in FIG. 4, for example.

Driving gears 3 are gear coupled with a first motor 36 (see FIG. 4), and are provided at two ends of a gear shaft so as to be gear coupled with the rack portions 2a.

A light-blocking-door opening/closing member 8 performs opening/closing of a light-blocking door for blocking a film entrance of the cartridge from light, by rotating while being inserted in an insertion hole 1a for opening/closing the light-blocking door. An engaging pin 8a is provided on the upper surface of the light-blocking-door opening/closing member 8, and is fitted in a slit 7a provided at one end of a driving lever 7. Another end 7b of the driving lever 7 is fitted in one end 6a of a transmission lever 6. A cam gear 5 is gear coupled with one of the driving gears 3 via an idler 4. A face cam portion 13 and a cam groove 12 are provided in the cam gear 5. A cam pin 6b provided at another end of the transmission lever 6 is fitted in the cam groove 12.

A sun gear 20 gear coupled with a second motor 37 (see FIG. 4), and a planet gear 21, revolvable around the sun gear 20, are rotatably pivoted on a reverse C-shaped planetary lever 23. The planetary lever 23 is rotatable around the gear shaft of the sun gear 20. A roller 22, made of rubber, is mounted on the shaft of the planetary gear 21 as one body therewith. A stopper 24 is provided on the main body of the camera in order to regulate the rotation of the planetary lever 23 in a clockwise direction.

A fork gear 9 includes a fork 9a for feeding/rewinding the film while engaging with a spool shaft 1b of the cartridge 1.

Next, a description will be provided of the operation of the camera having the above-described configuration.

FIG. 1 illustrates a state in which the cartridge is not yet loaded within the camera (i.e., the camera is empty), and the cover 2 of the cartridge-loading chamber is closed. In this state, the light-blocking-door opening/closing member 8 of the cartridge 1 is held at a position of being rotated in a clockwise direction. That is, a state of opening the light-blocking door of the film entrance of the cartridge 1 when the cartridge 1 is loaded (were the cartridge 1 loaded) is provided. This situation will now be described in detail. In a state in which the cover 2 of the cartridge-loading chamber is completely closed and stops at the position of FIG. 1, the transmission lever 6 is rotated in a counterclockwise direction by the engagement of the cam pin 6b of the transmission lever 6 with a first cam groove portion 12a of the cam groove 12 of the cam gear 5, so that the driving lever 7 is rotated in a clockwise direction, and the light-blocking-door opening/closing member 8 is also rotated in a clockwise direction. Since the planetary lever 23 is freely rotatable in a counterclockwise direction until a distal end 23a of the planetary lever 23 contacts a first cam surface 13a of the face cam portion 13, the roller 22 applies no load to the external sleeve of the cartridge 1.

In this state, if an opening/closing operation switch (to be described later) is depressed in order to open the cover 2 of the cartridge-loading chamber, the first motor 36 is turned on, to rotate the driving gear 3 in a counterclockwise direction. Accordingly, the cover 2 of the cartridge-loading chamber is slidably driven toward the right and stops at a position completely retracted to the right from the cartridge loading entrance 10 (the state shown in FIGS. 2 and 4).

In this state, the transmission lever 6 is rotated in a clockwise direction while the cam pin 6b is guided by a second cam groove portion 12b, so that the driving lever 7 is rotated in a counterclockwise direction. The light-blocking-door opening/closing member 8 is thereby rotated in a counterclockwise direction, so that the light-blocking door of the film entrance of the cartridge 1 is closed when the cartridge 1 is loaded.

Thereafter, by inserting the cartridge 1 from below the camera into the cartridge loading entrance 10 in the axial direction, a switch (to be described later) is switched on, so that the cartridge 1 is drawn within the camera by the pressing rotating force of the roller 22. That is, the planetary gear 21 is rotated in a counterclockwise direction via the sun gear 20 gear coupled with a second motor 37, to rotate the roller 22 in a counterclockwise directions so that the cartridge 1 is drawn into the camera by the rubber pressure of the roller 22 in a direction orthogonal to the shaft of the cartridge 1. After the cartridge 1 has been completely drawn within the camera, the second motor 37 is turned off and the first motor 36 is turned on to rotate in a direction reverse to the above-described direction, so that the cover 2 of the cartridge-loading chamber is slidably moved toward the left. It is necessary to hold the light-blocking-door opening/closing member 8 in the state of FIG. 2 (i.e., the state of closing the light-blocking door of the film entrance of the cartridge 1) until a distal-end portion 2b of the cover 2 completely covers the cartridge loading entrance 10. This can be realized by the second cam groove portion 12b of the cam groove 12 engaging with the cam pin 6b of the transmission lever 6 (the state of FIG.

When the cover 2 has slidably moved and reached a position where the distal-end portion 2b completely covers the cartridge loading entrance 10, the engaging partner of the cam pin 6b of the transmission lever 6 is shifted from the second cam groove portion 12b to the first cam groove portion 12a of the cam groove 12. The transmission lever 6 thereby rotates in a counterclockwise direction to rotate the driving lever 7 in a clockwise direction, so that the light-blocking-door opening/closing member 8 is rotated in a clockwise direction to open the light-blocking door of the film entrance of the cartridge 1. On the other hand, since the face cam portion 13 retracts from the distal-end portion 23a of the planetary lever 23, the planetary lever 23, which has thereby contacted the face cam portion 13 of the cam gear 5, becomes rotatable in a counterclockwise direction by the amount of retraction of the face cam portion 13. Hence, the roller 22, which has pressed the external sleeve of the cartridge 1 by the rubber pressure, is freed with respect to the cartridge 1, so that the pressure against the cartridge 1 is removed. Accordingly, the position of the cartridge 1 is not regulated by the roller 22 after the cartridge 1 has been loaded.

Thus, load is not applied from the roller 22 to the spool shaft 1b of the cartridge 1 during the feeding of the film from the cartridge 1, i.e., during thrust driving, which will be subsequently performed, so that the film can be fed with a stable feeding torque.

Thereafter, the cover 2 of the cartridge-loading chamber is further moved toward the left by the first motor 36 and contacts a stopper (not shown) to turn off the first motor 36, whereby the movement of the cover 2 to the left is stopped and the loading operation of the cartridge 1 is completed (corresponding to the state shown in FIGS. 3 and 6).

An operation of extracting the cartridge 1 is reverse to the above-described operation. The relationship between the roller 22 and the cartridge 1 will now be described in detail.

Figure 7:
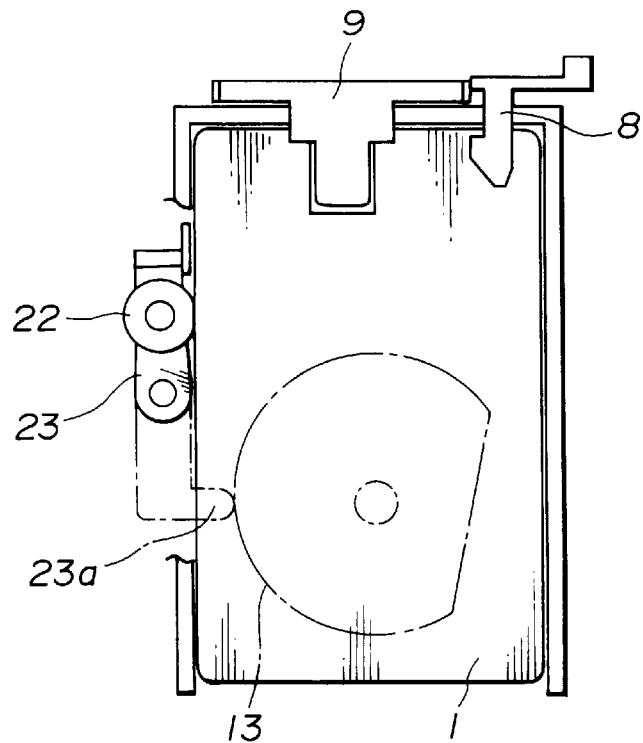
FIG. 7 is a cross-sectional view of the cartridge loading chamber of the first embodiment, illustrating a state in which a roller is pressed against the cartridge.
Figure 8:
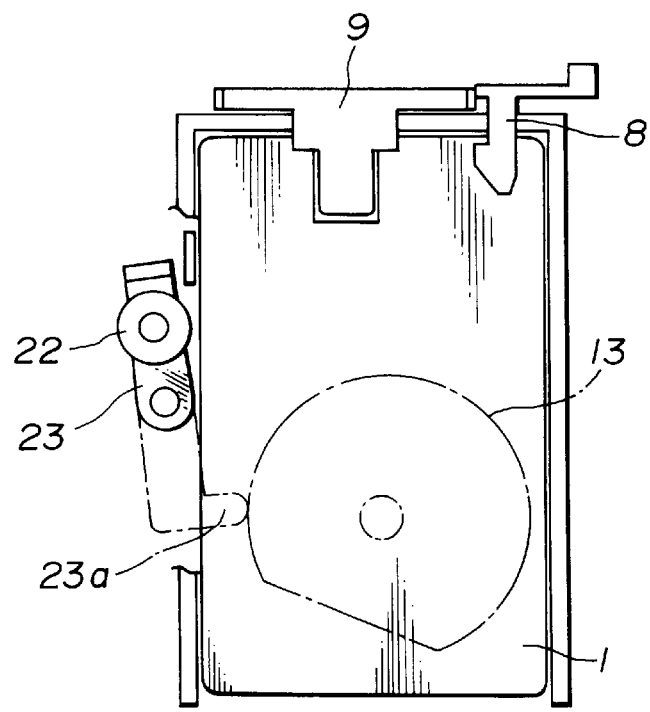
FIG. 8 is a cross-sectional view of the cartridge loading chamber of the first embodiment, illustrating a state in which the roller is retracted from the cartridge.

FIGS. 7 and 8 are cross-sectional views of the cartridge-loading chamber.

FIG. 7 illustrates a state of the roller 22 while the cartridge 1 is drawn into the camera or is taken out of the camera. In FIG. 7, the rotation of the distal-end portion 23*a* of the planetary lever 23 in a counterclockwise direction is regulated by the face cam portion 13. In this state, the outer shape of the roller 22 slightly overlaps with the shell surface of the cartridge 1 due to the rubber of the roller 22. Accordingly, the roller 22 generates a pressing force against the shell of the cartridge 1, so that the cartridge 1 is drawn into or taken out of the camera in accordance with the direction of rotation of the roller 22.

FIG. 8 illustrates the state of the roller 22 after the cartridge 1 has been completely drawn within the camera. The planetary lever 23 is rotatable in a counterclockwise direction until its distal-end portion 23*a* contacts the face cam portion 13. Accordingly, in the state of FIG. 8, the roller 22 can assume a state of retracting from the shell surface of the cartridge 1 by rotating in a counterclockwise direction via the planetary lever 23, so that the pressing force of the roller 22 against the shell of the cartridge 1 is not generated at all.

Figure 9:
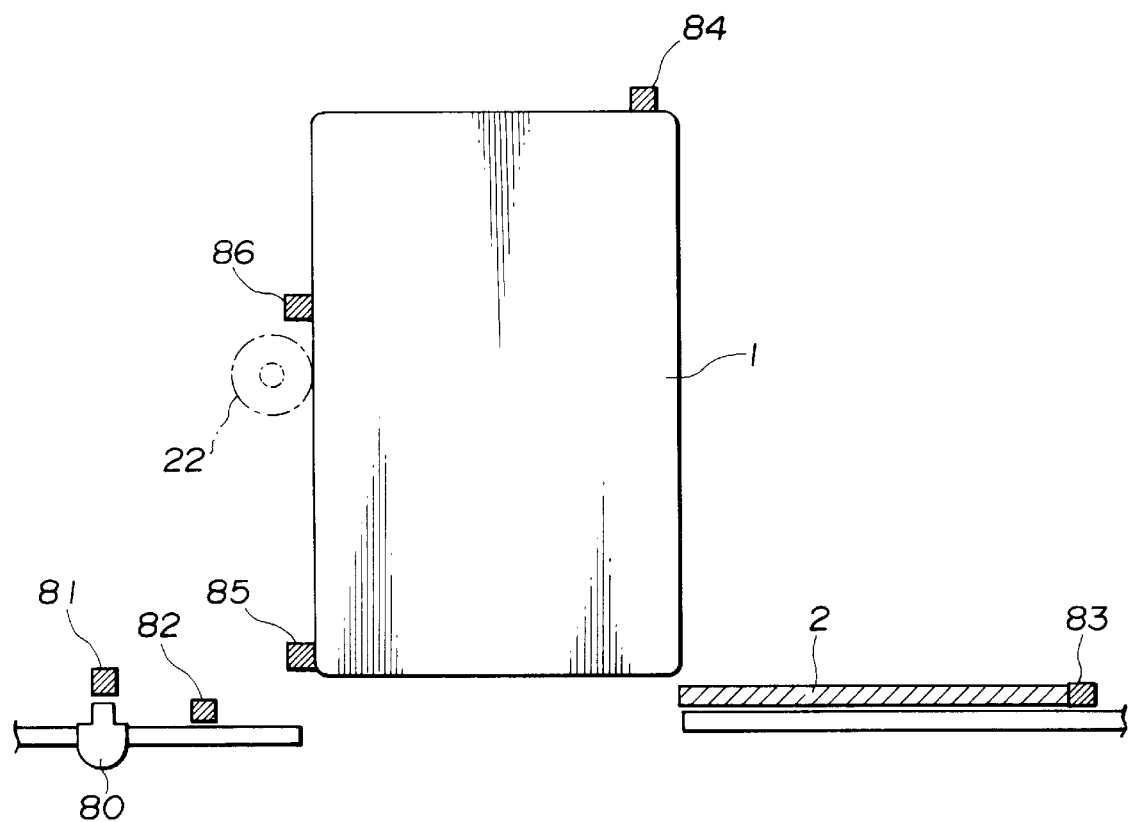
FIG. 9 is a diagram illustrating arrangement of switches in the first embodiment.

FIG. 9 is a diagram illustrating the arrangement of switches for performing the above-described operation and control.

In FIG. 9, a cover opening/closing operation switch 81 is switched on by depressing an opening/closing operation button 80 provided on the cover 2. A completely-closed-cover detection switch 82 detects the completion of an operation of closing the cover 2 of the cartridge-loading chamber. A completely-opened-cover detection switch 83 detects the completion of an operation of opening the cover 2. A cartridge detection switch 84 detects the fact that the cartridge 1 has been completely drawn within the camera. An insertion detection switch 85 detects the fact that the cartridge 1 has been inserted within the camera from the entrance. An extraction completion switch 86 detects the completion of an operation of extracting the cartridge 1 from the cartridge-loading chamber. The above-described switches are usually switched off.

Figure 10:
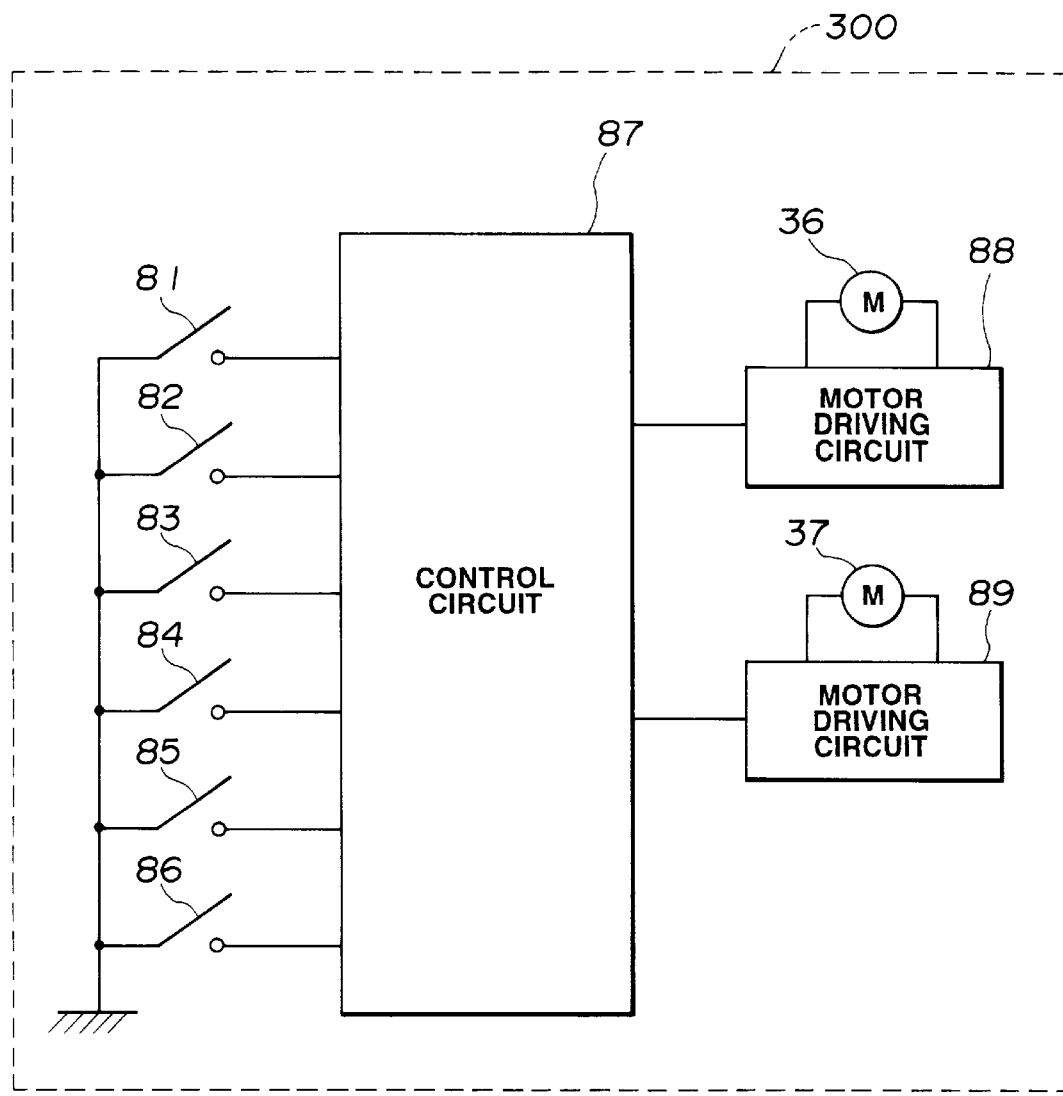
FIG. 10 is a diagram illustrating circuitry of the first embodiment.

FIG. 10 is a diagram illustrating circuitry, including the above-described switches, for performing the above-described operations and controls. In FIG. 10, a control circuit 87 comprises a microcomputer for performing the above-described controls, and the like. Motor driving circuits 88 and 89 perform the driving of the above-described motors 36 and 37 in the forward and reverse directions, respectively. Reference numeral 300 represents the camera.

Figure 11:
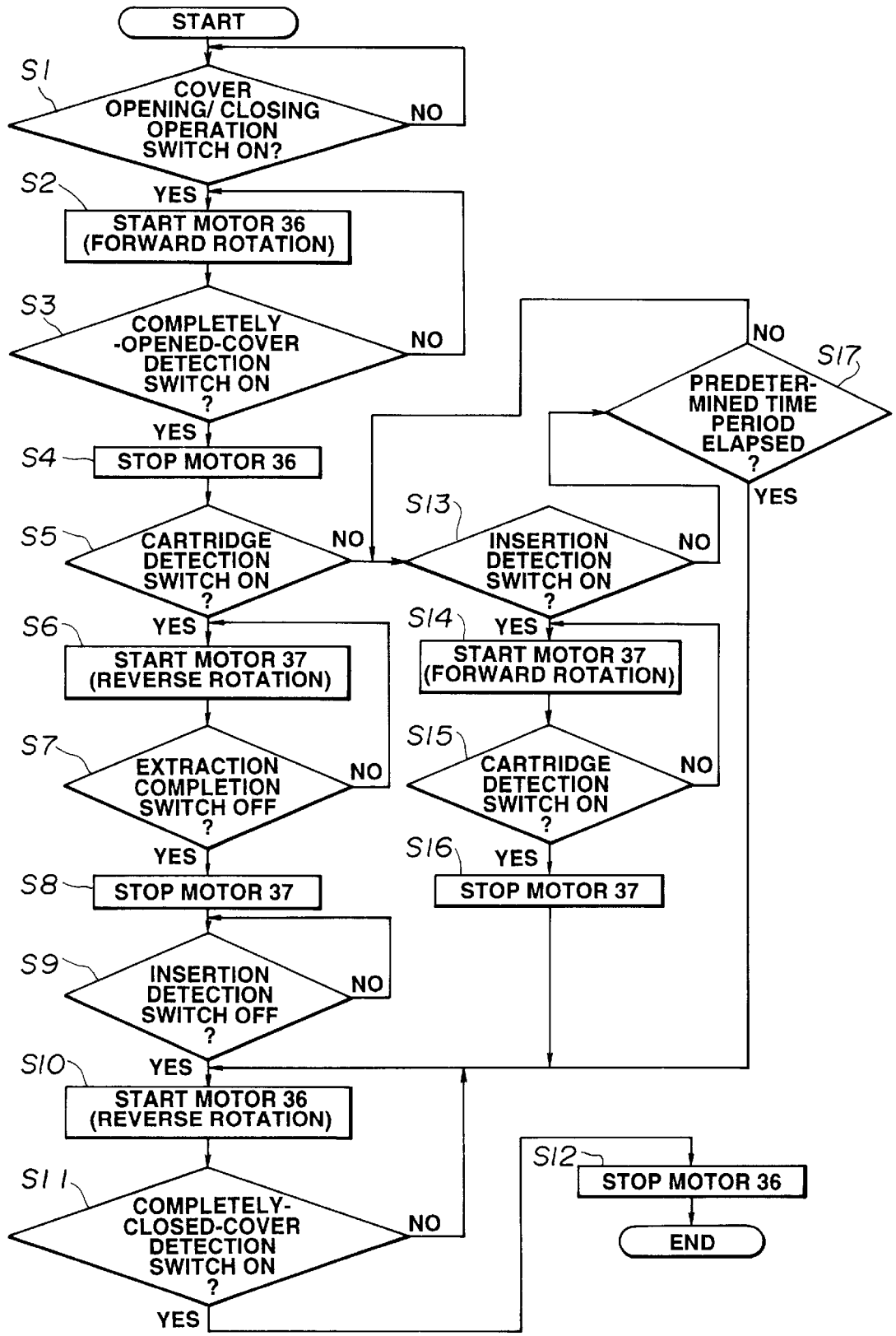
FIG. 11 is a flowchart illustrating the operation of the circuitry shown in FIG. 10.

Next, a description will be provided of operations of drawing and extracting the cartridge by the circuitry shown in FIG. 10 with reference to the flowchart of the control circuit 87 shown in FIG. 11.

First, the operation of drawing the cartridge 1 into the cartridge-loading chamber will be described. When the cover opening/closing operation switch 81 has been switched on by the user manually operating the opening/closing operation button 80 of the cover 2 (step S1), the motor 36 is rotated in the forward direction by the motor driving circuit 88 (step S2), and the cover 2 of the cartridge-loading chamber is opened and the operation is started. When the cover 2 has been completely opened and the completely-opened-cover detection switch 83 has been switched on (step S3), the motor 36 is stopped (step S4). In this state,, the cartridge detection switch 84 for detecting if the cartridge 1 is present within the camera is switched off (step S5). Accordingly, when the cartridge 1 has been inserted from the cartridge entrance, the insertion detection switch 85 is switched on (step S13), the motor 37 is rotated in the forward direction by the motor driving circuit 89 (step S14), and the cartridge 1 is drawn into the camera by driving the roller 22. Upon completion of the operation of drawing the cartridge 1 into the camera, the cartridge detection switch 84 is switched on (step S15), and the motor 37 is stopped (step S16).

Thereafter, the motor 36 is rotated in the reverse direction (step S10), to close the cover 2 of the cartridge-loading chamber. Upon completion of the operation of closing the cover 2, the completely-closed-cover detection switch 82 is switched on (step S11), and the motor 36 is stopped (step S12), to terminate the cartridge-loading operation.

Next, a description will be provided of an operation of extracting the cartridge 1 from the cartridge-loading chamber.

If the opening/closing operation button 80 is operated in a state in which the cartridge 1 is loaded within the camera, the cover opening/closing operation switch 81 is switched on, and the process proceeds from step S1 to step S5 in the above-described manner. Since the cartridge detection switch 84 is switched on in step S5, the process proceeds to step S6, where the motor 37 is rotated in the reverse direction, whereby the roller 22 is driven to extract the cartridge 1. Upon completion of the extracting operation, the extraction completion switch 86 is switched off (step S7), and the motor 37 is stopped (step S8). In this state, the cartridge 1 stops at a position where about half of the cartridge 1 is exposed from the cartridge loading entrance. By the user thereafter extracting the cartridge 1, the insertion detection switch 85 is switched off (step S9), and the motor 36 is rotated in the reverse direction, to close the cover 2 of the cartridge-loading chamber. Upon completion of the operation of closing the cover 2, the completely-closed-cover detection switch 82 is switched on (step S11), and the motor 36 is stopped (step S12). When the cartridge 1 has not been inserted even after the lapse of a predetermined time period after the cover 2 of the cartridge-loading chamber was opened while loading the cartridge 11 a timer provided within the control circuit 87 determines the lapse of the time period (step S17), and the process proceeds to step S10, where the cover 2 is closed again.

Next, a description will be provided of a second embodiment of the present invention.

In the first embodiment, the cover of the cartridge-loading chamber is driven by the motor. In the second embodiment, however, the cover is manually driven.

Figure 12:
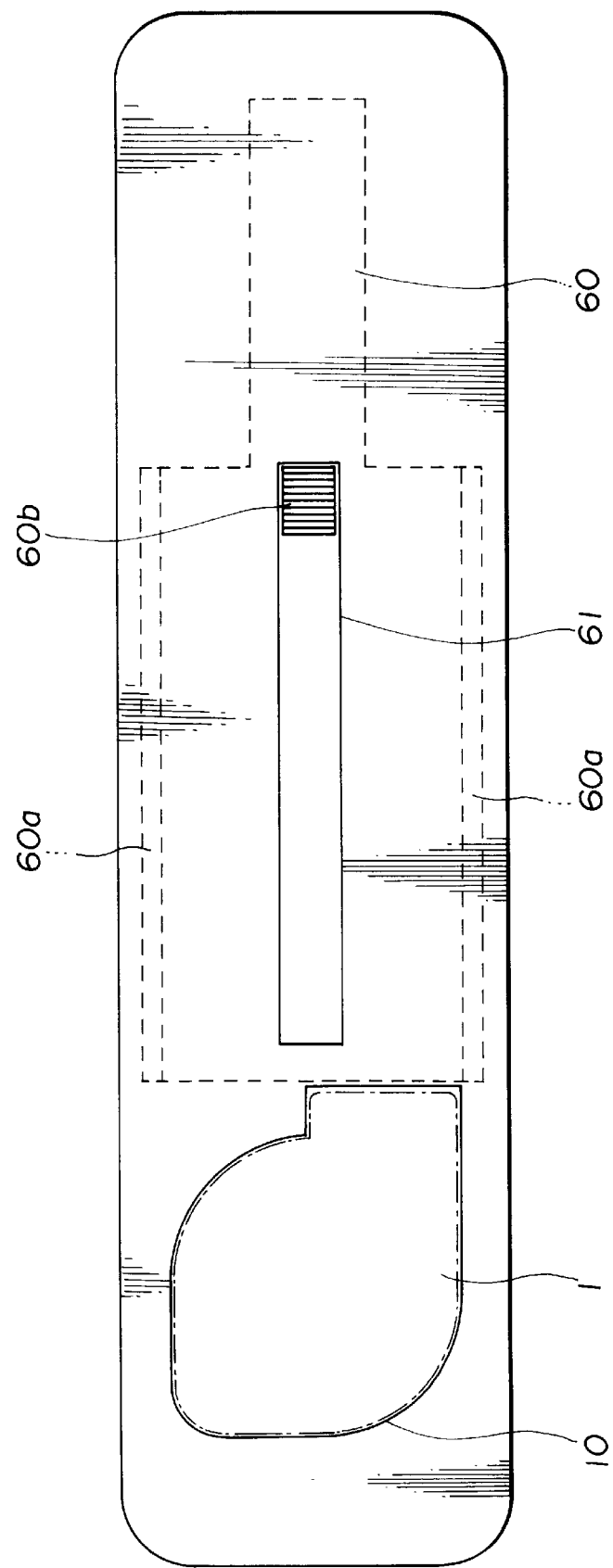
FIG. 12 is a bottom plan view of a camera according to a second embodiment of the present invention.
Figure 13:
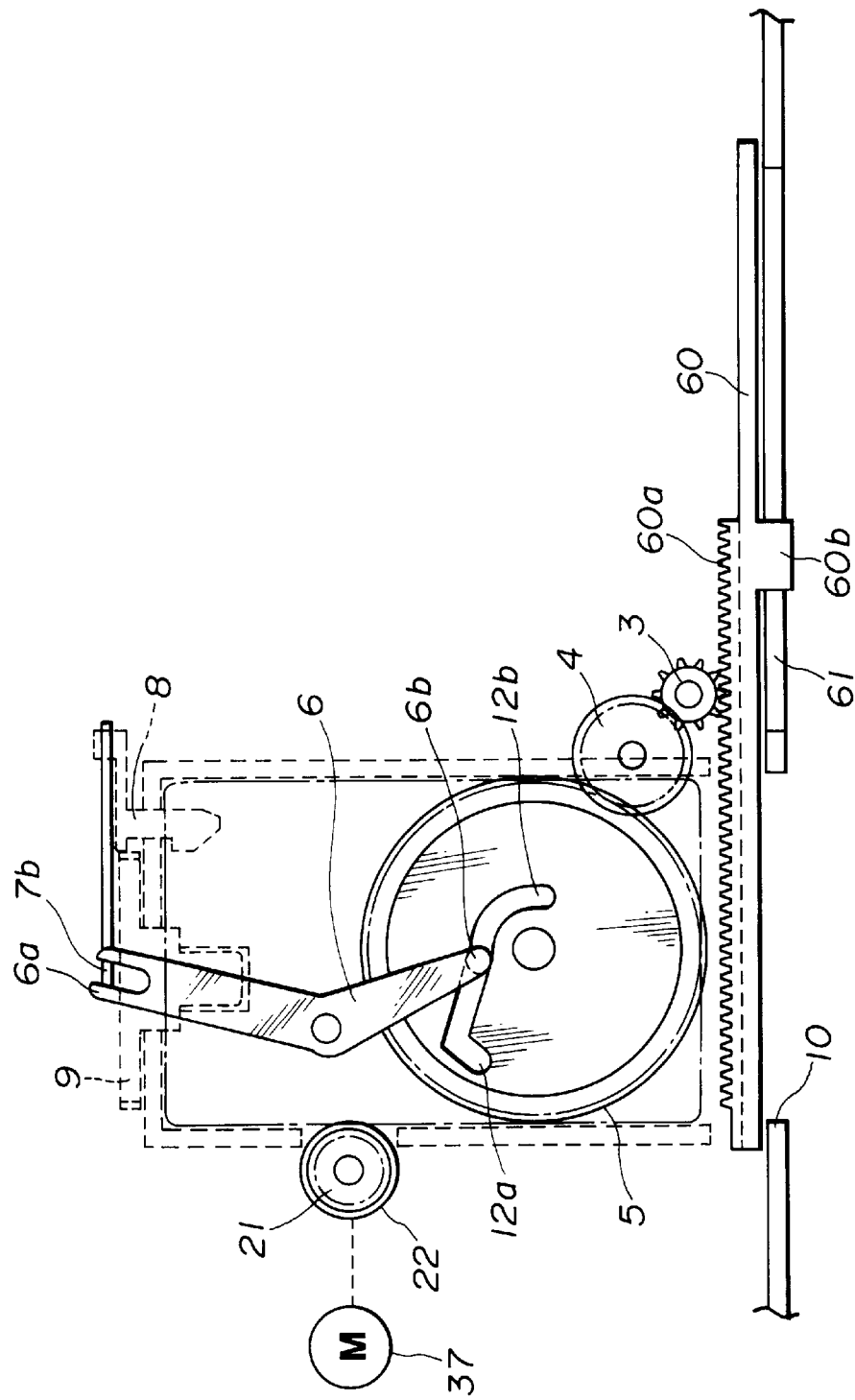
FIG. 13 is a schematic plan view illustrating a state during an opening/closing operation of a cover of a cartridge loading chamber of the second embodiment.
Figure 14:
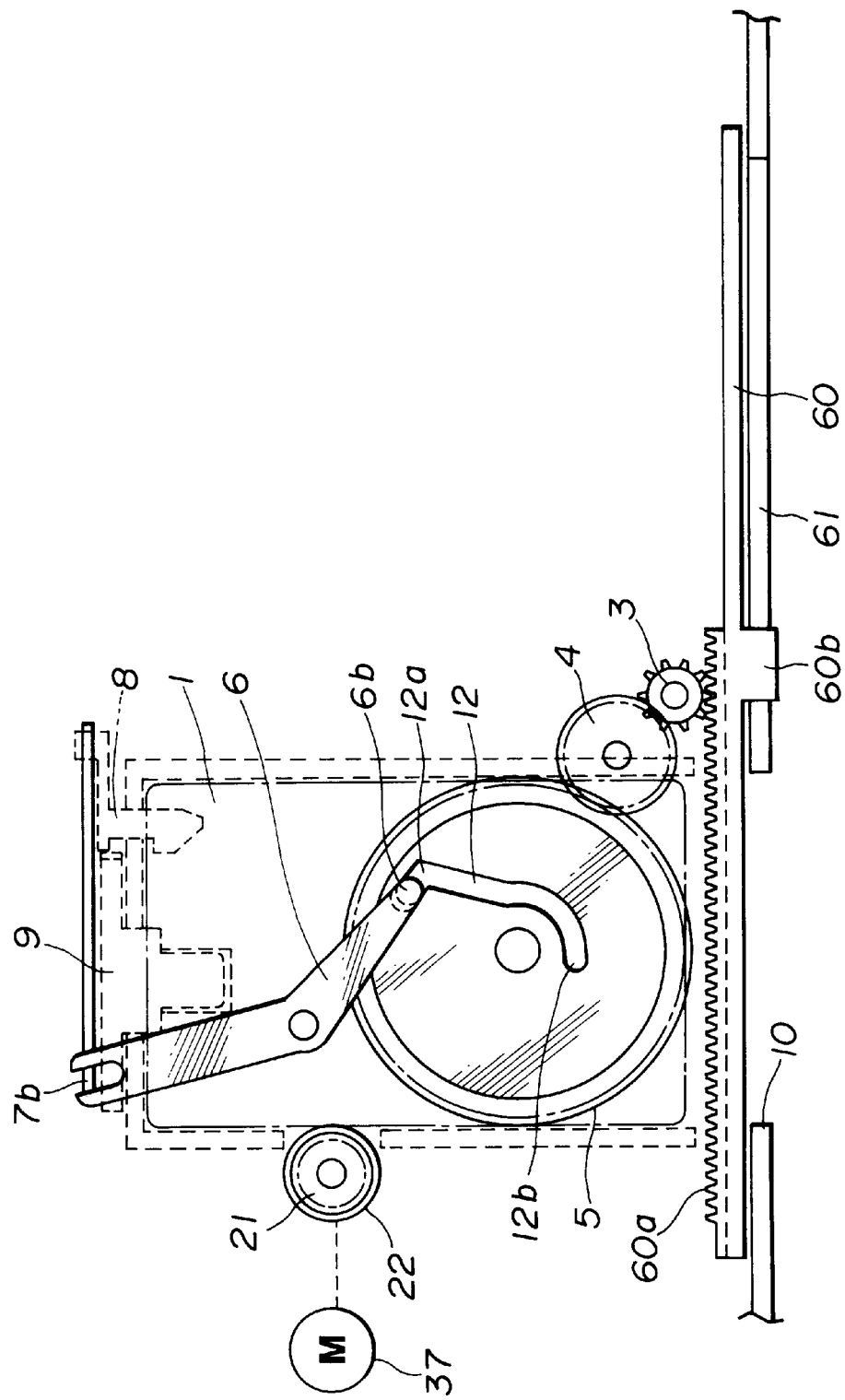
FIG. 14 is a schematic plan view illustrating a closed state of the cover of the cartridge loading chamber of the second embodiment.

FIG. 12 is a bottom plan view of a camera according to the second embodiment. FIGS. 13 and 14 are schematic plan views illustrating states during opening/closing operations of a cover of a cartridge-loading chamber as in the case of the first embodiment.

In FIGS. 12 through 14, the same components as those in the first embodiment are indicated by the same reference numerals.

The present embodiment differs from the first embodiment in that a knob 60*b* for a manual operation is provided on the lower surface of a cover 60 of a cartridge-loading chamber as one body with the cover 60. By sliding the knob 60*b* in a slit 61 provided in the lower-surface cover of the camera, the cam gear 5 is rotated by two rack portions 60*a* provided on the cover 60 via the driving gear 3 and the idler 4. The light-blocking-door opening/closing member 8 of the cartridge is operated in the subsequent processing which is the same as in the first embodiment.

As described above, according to the above-described embodiments, the opening/closing operations of the cartridge loading entrance are performed by slidably moving the cover of the cartridge-loading chamber. An overstroke range is provided in operations after the cartridge loading entrance has been completely closed, and the opening/closing operations of the light-blocking door of the cartridge are linked with the opening/closing operations of the cartridge loading entrance by utilizing the overstroke range. Hence, the opening/closing operations of the cover of the cartridge-loading chamber can be linked with the opening/closing operations of the light-blocking door of the cartridge by a single driving source, so that a wide space is not required in the camera, thereby causing a reduction in the size and the cost of the camera which has a simple mechanism.

Since the opening/closing operations of the light-blocking door of the cartridge are performed while the cover of the cartridge-loading chamber is closed, no problem arises with respect to the timing of light blocking.

Although in the above-described embodiments, the roller for driving the cartridge is retracted with the timing of the completion of loading of the cartridge, the roller may be retracted at any other timing provided that the roller can be retracted when feeding the film.

Any methods of preventing application of inconvenient load for film feeding to the cartridge other than the retraction of the above-described roller may be adopted, provided that the object of the invention can be achieved.

Next, a description will be provided of a third embodiment of the present invention.

Figure 15:
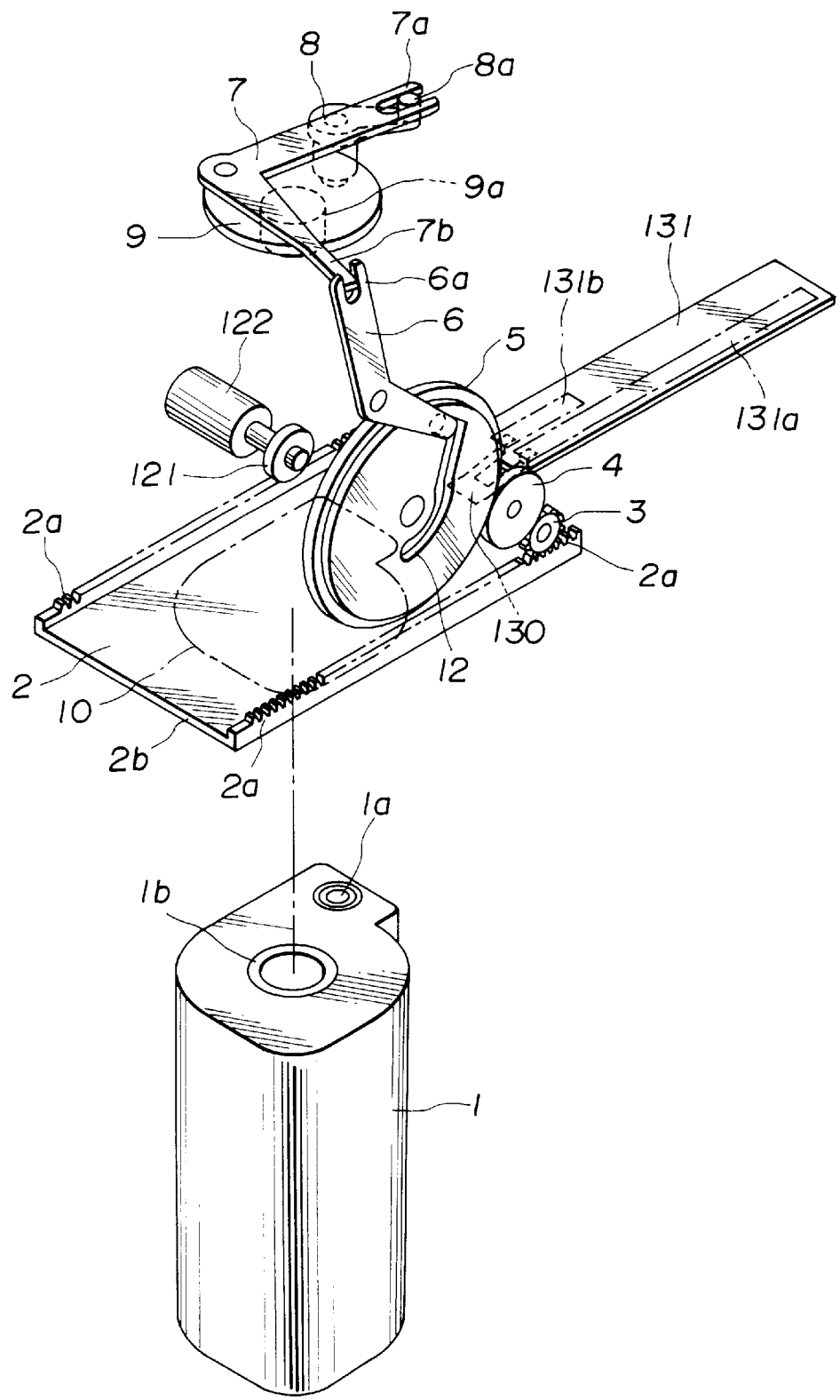
FIG. 15 is a perspective view illustrating a closed state of a cover of a cartridge loading chamber according to a third embodiment of the present invention.
Figure 16:
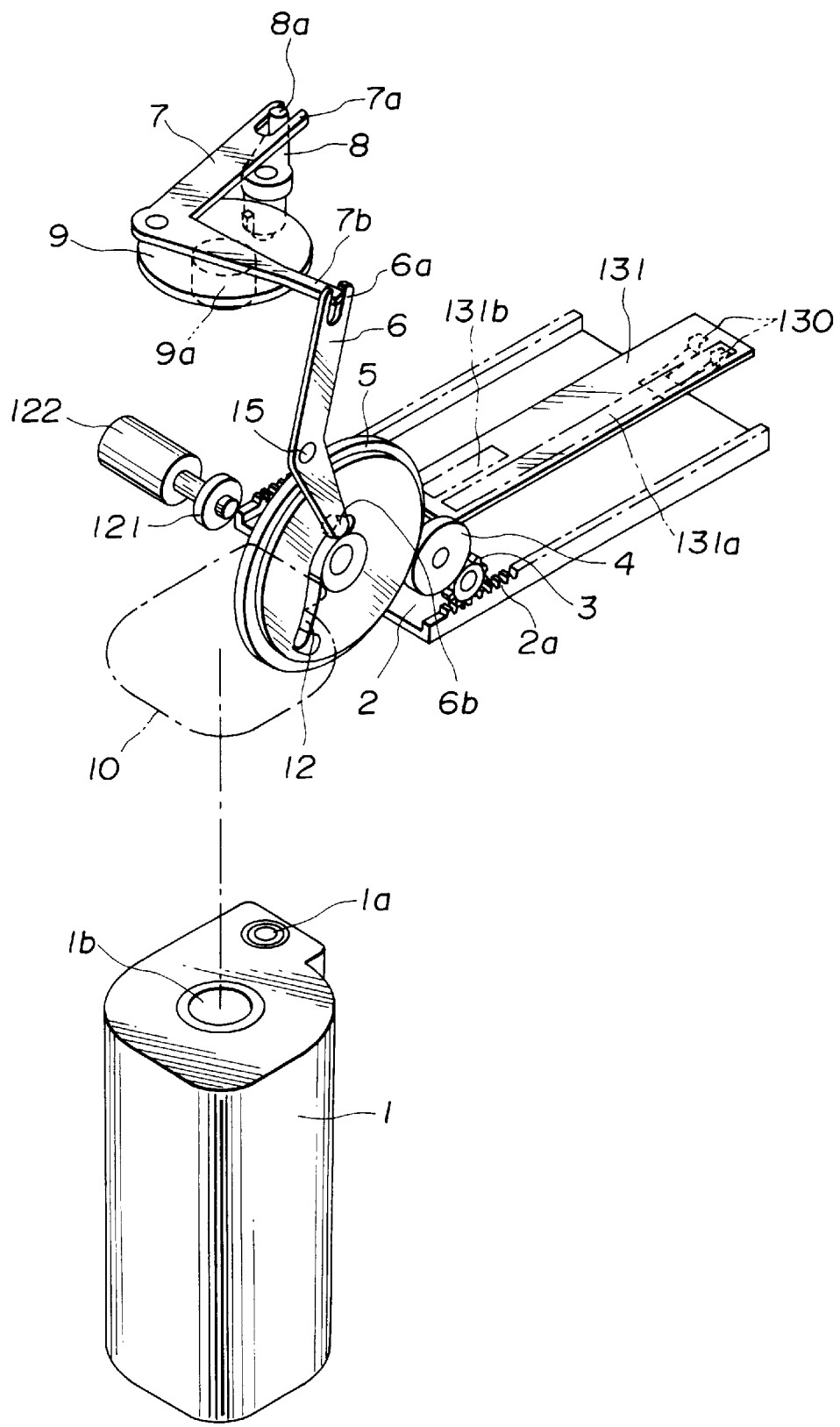
FIG. 16 is a perspective view illustrating an opened state of the cover of the cartridge loading chamber shown in FIG. 15.
Figure 17:
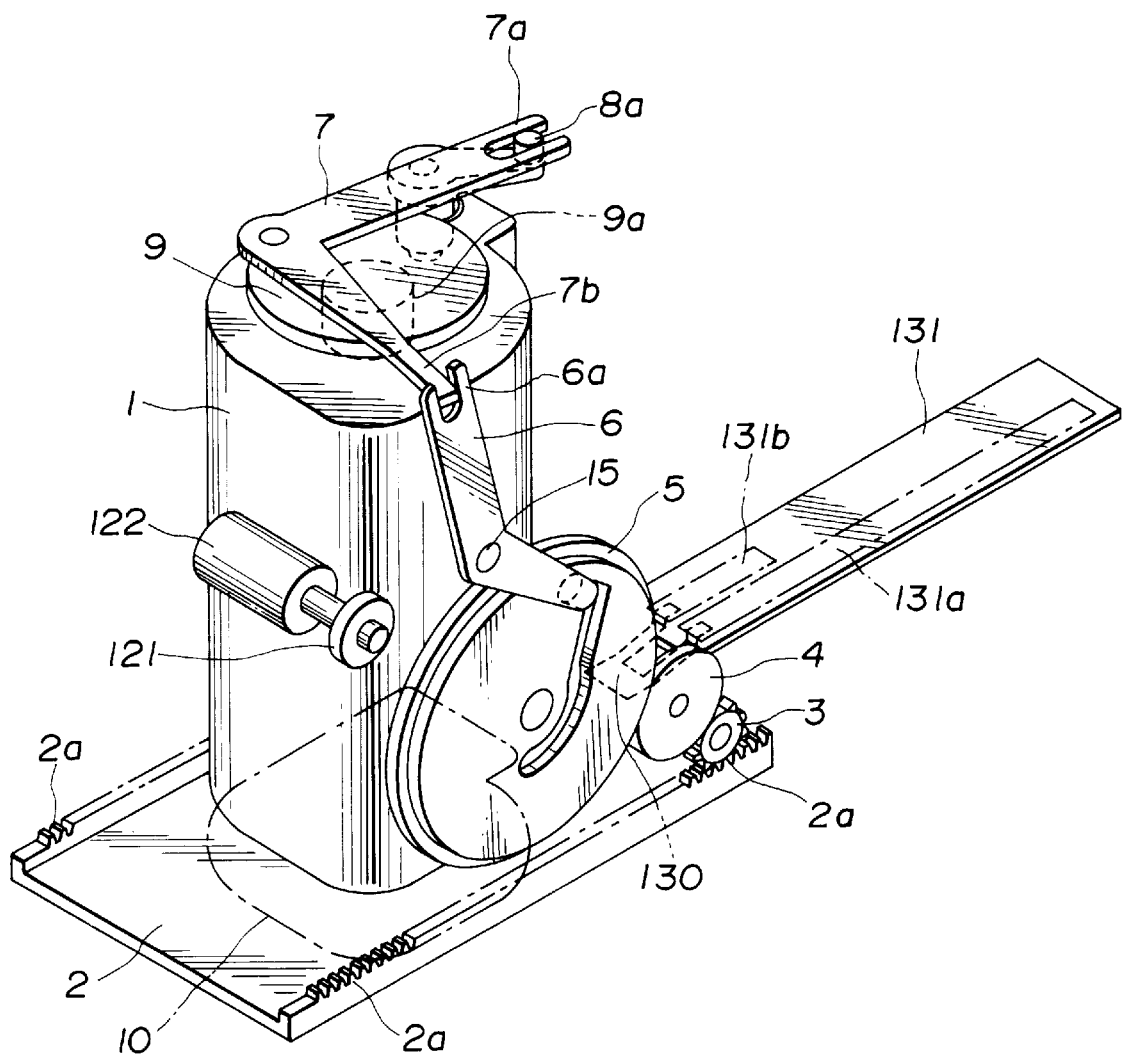
FIG. 17 is a perspective view illustrating a state in which a cartidge is loaded in the cartridge loading chamber shown in FIG. 15.
Figure 18:
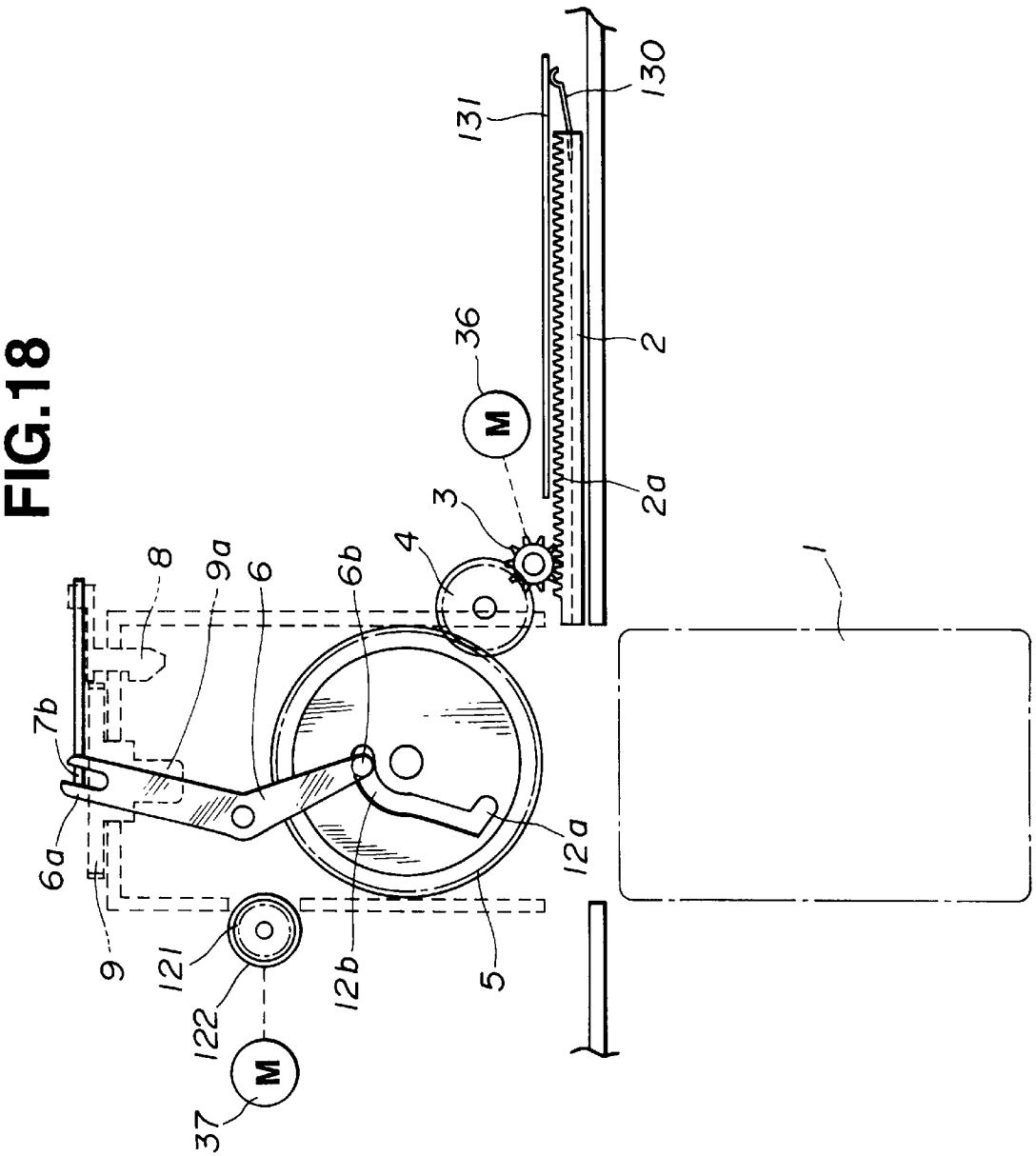
FIG. 18 is a schematic plan view of the state shown in FIG. 16.
Figure 19:
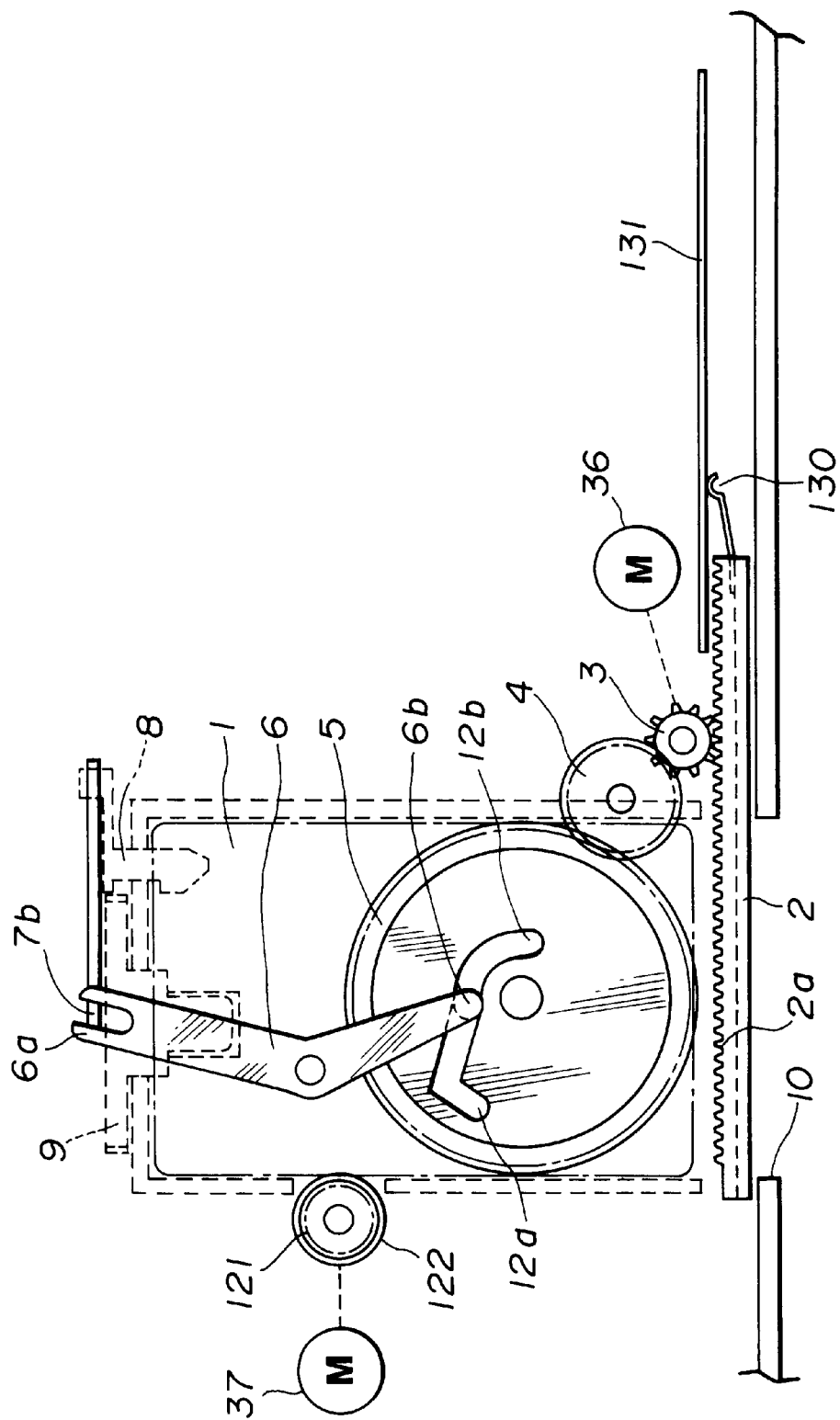
FIG. 19 is a schematic plan view illustrating a state during an opening/closing operation of the cover of the cartridge loading chamber of the third embodiment.
Figure 20:
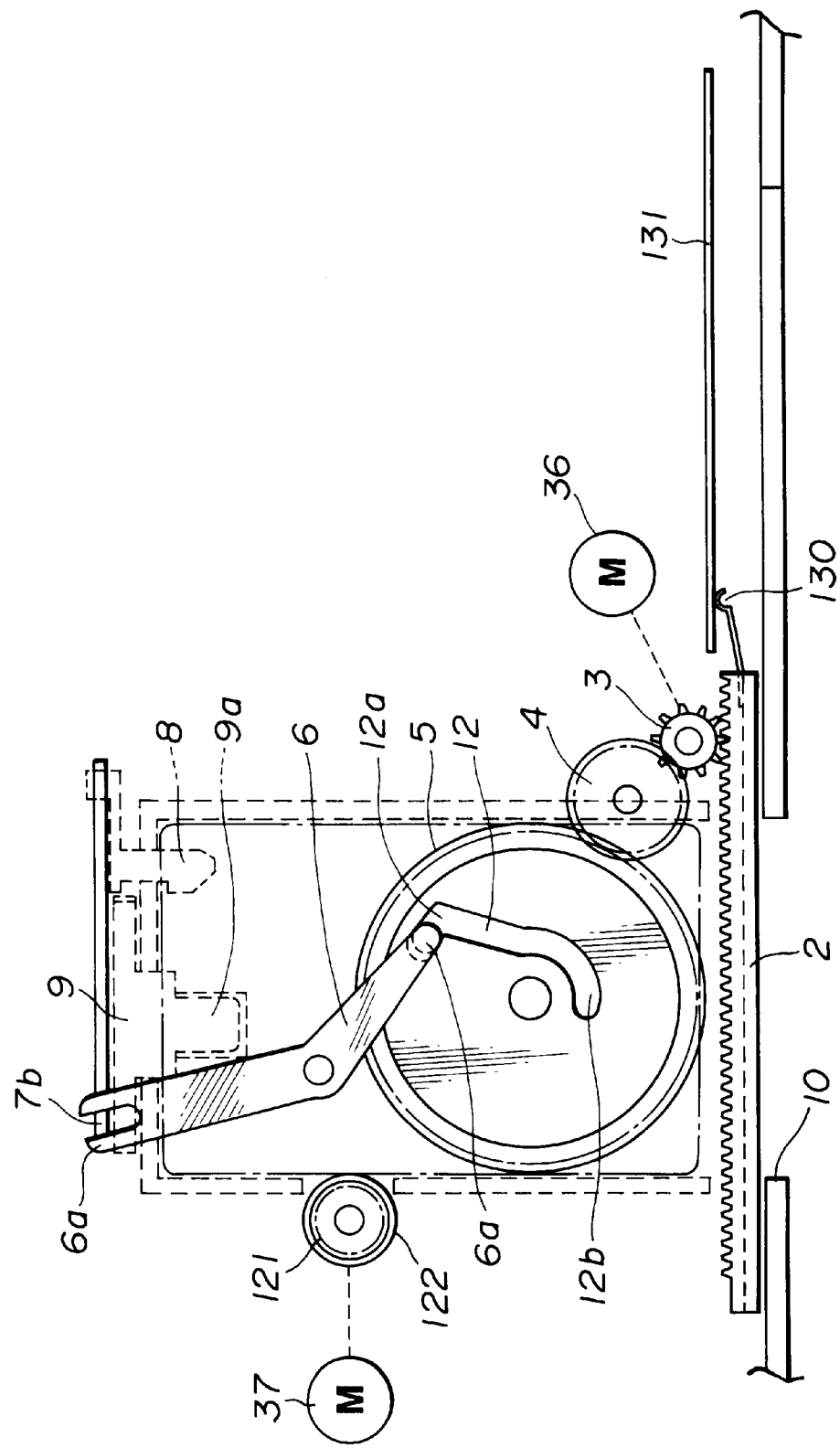
FIG. 20 is a schematic plan view of the state shown in FIG. 17.

FIGS. 15 through 17 are perspective views of a film-cartridge loading device of a camera according to the third embodiment. FIGS. 18 through 20 are schematic plan views of the film-cartridge loading device of the third embodiment. In FIGS. 15 through 20, the same components as those in the above-described embodiments are indicated by the same reference numerals, and a description thereof will be omitted.

In FIGS. 15 through 20, a roller 122, made of rubber, is mounted on the shaft of a roller-driving gear 121, gear coupled to a second motor 37, as one body with the roller-driving gear 121. An armature 130 for position detection is fixed on the inner side of the cover 2 of the cartridge-loading chamber so as to move in contact with patterns 131*a* and 131*b* of a pattern substrate 131. The pattern 131*a* is arranged to contact the armature 130 over the entire stroke range of the cover 2. The pattern 131*b* is provided so as to contact the armature 130 within an overstroke range from a position where the cover 2 of the cartridge-loading chamber completely covers the cartridge loading entrance 10.

Next, a description will be provided of the operation of the camera having the above-described configuration. FIG. 15 illustrates a state in which the cartridge is not loaded within the camera (i.e., the camera is empty), and the cover 2 of the cartridge-loading chamber is closed. In this states the light-blocking-door opening/closing member 8 of the cartridge 1 is held at a position of being rotated in a clockwise direction. That is, a state of opening the light-blocking door of the film entrance of the cartridge 1 when the cartridge 1 is loaded (were the cartridge 1 loaded) is provided. This situation will now be described in detail. In a state in which the cover 2 of the cartridge-loading chamber is completely closed and stops at the position of FIG. 15, the transmission lever 6 is rotated in a counterclockwise direction by the engagement of the cam pin 6*b* of the transmission lever 6 with the first cam groove portion 12*a* of the cam groove 12 of the cam gear 5, so that the driving lever 7 is rotated in a clockwise direction, and the light-blocking-door opening/closing member 8 is also rotated in a clockwise direction.

In this state, if an opening/closing operation switch (not shown) is depressed in order to open the cover 2 of the cartridge-loading chamber) the first motor 36 is turned on, to rotate the driving gear 3 in a counterclockwise direction. Accordingly, the cover 2 of the cartridge-loading chamber is slidably driven toward the right and stops at a position completely retracted to the right from the cartridge loading entrance 10 (the state shown in FIGS. 16 and 18). In this state, the transmission lever 6 is rotated in a clockwise direction while the cam pin 6*b* is guided by the second cam groove portion 12*b*, so that the driving lever 7 is rotated in a counterclockwise direction. The light-blocking-door opening/closing member 8 is thereby rotated in a counterclockwise direction, so that the light-blocking door of the film entrance of the cartridge 1 is closed when the cartridge 1 is loaded.

Thereafter, by inserting the cartridge 1 from below the camera into the cartridge loading entrance 10 in the axial direction, the cartridge 1 is drawn within the camera by the pressing rotating force of the roller 122. That is, the roller-driving gear 121 gear coupled with the second motor 37, is rotated in a counterclockwise direction to rotate the roller 122 in a counterclockwise direction, so that the cartridge 1, pressed in a direction orthogonal to the shaft of the cartridge 1 by the rubber pressure of the roller 122, is drawn into the camera. After the cartridge 1 has been completely drawn within the camera, the second motor 37 is turned off and the first motor 36 is turned on to rotate in a direction reverse to the above-described direction, so that the cover 2 of the cartridge-loading chamber is slidably moved toward the left. It is necessary to hold the light-blocking-door opening/closing member 8 in the state of FIG. 16 (i.e., the state of closing the light-blocking door of the film entrance of the cartridge 1) until the distal-end portion 2*b* of the cover 2 completely covers the cartridge loading entrance 10. This can be realized by the second cam groove portion 12*b* of the cam groove 12 engaging with the cam pin 6*b* of the transmission lever 6 (the state of FIG. 19).

When the cover 2 has slidably moved and reached a position where the distal-end portion 2*b* completely covers the cartridge loading entrance 10, the engaging partner of the cam pin 6*b* of the transmission lever 6 is shifted from the second cam groove portion 12*b* to the first cam groove portion 12*a* of the cam groove 12. The transmission lever 6 thereby rotates in a counterclockwise direction to rotate the driving lever 7 in a clockwise direction, so that the light-blocking-door opening/closing member 8 is rotated in a clockwise direction to open the light-blocking door of the film entrance of the cartridge 1.

On the other hand, when the cover 2 has reached the above-described position, the armature 130 contacts the pattern 131*b*, to detect that the cover 2 has been completely closed. Thereafter, since the first motor 36 continues to rotate, the cover 2 of the cartridge-loading chamber is further moved to the left and contacts a stopper (not shown) to turn off the first motor 36, whereby the cover 2 stops and the loading operation of the cartridge 1 is completed (the state shown in FIGS. 17 and 20).

Figure 21:
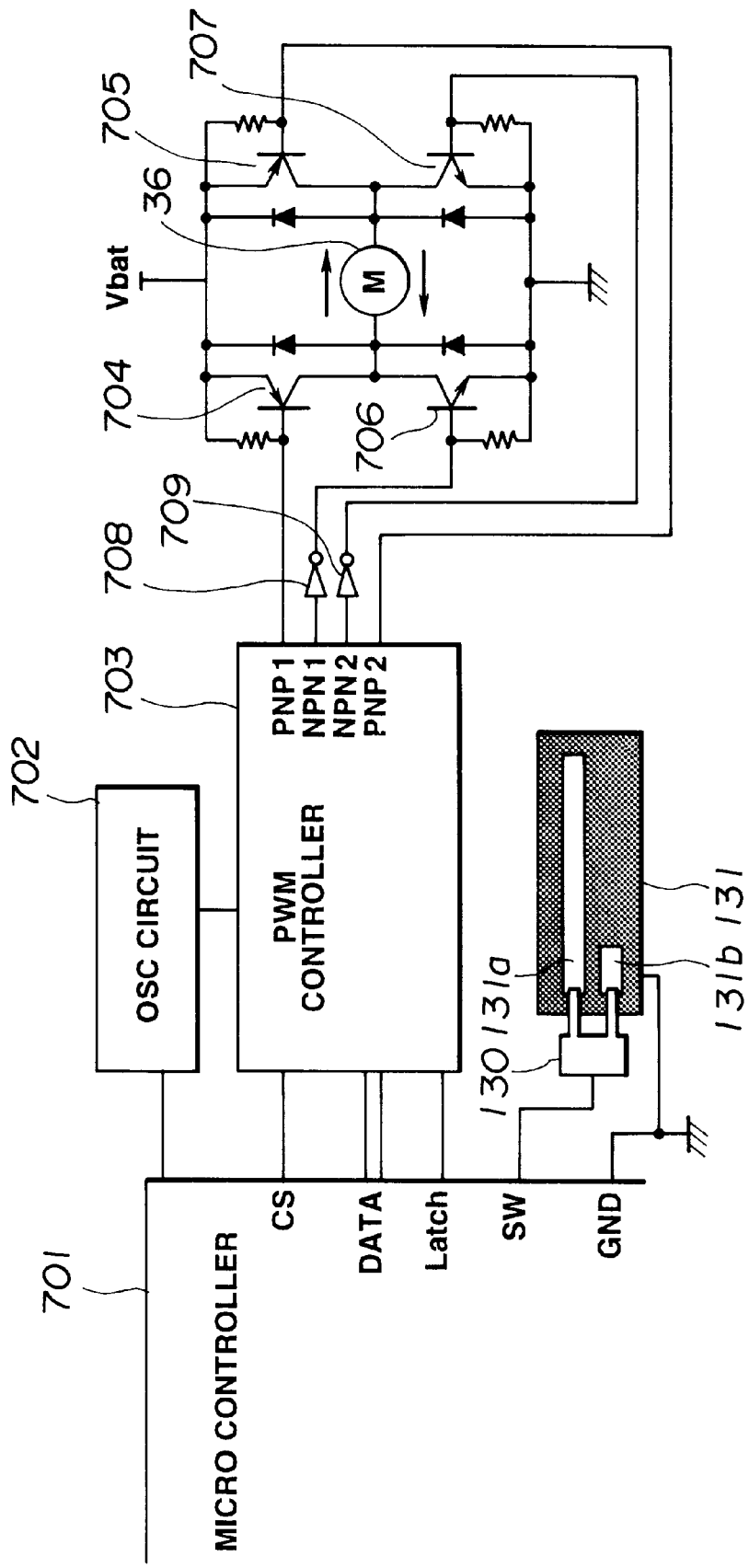
FIG. 21 is a diagram illustrating a control circuit of the third embodiment.

FIG. 21 is a diagram illustrating a control circuit of the above-described configuration. In FIG. 21, reference numeral 701 represents a known microcontroller for controlling power supply to the first motor 36. Reference numeral 703 represents a known PWM (pulse width modulation) controller for performing pulse-width modulation of a signal for controlling power supply to the first motor 36. An oscillator 702 supplies the microcontroller 701 and the PWM controller 703 with a reference clock-pulse signal. Reference numerals 704–707 represent transistors for switching power supply to the first motor 36. Reference numerals 708 and 709 represent inverters.

In an initial state in which power is not supplied to the first motor 36, an input terminal CS of the PWM controller 703 assumes an L level, whereby each of output terminals PNP1, PNP2, NPN1 and NPN2 assumes an H level. In this state, all of the transistors 704–707 are turned off.

When the completion of insertion of the cartridge has been detected by a cartridge detection switch (not shown) in a state in which the cover 2 of the cartridge-loading chamber is opened, the microcontroller 701 detects the fact, and starts to supply power to the first motor 36 to close the cover 2. A description will now be provided of procedures of that operation with reference to the flowchart of the microcontroller 701 shown in FIG. 25.

First, in step S101, a selection signal CS for the PWM controller 703 is made an H level. Thereafter, data is transmitted to the PWM controller 703 so as to provide a desired pulse width (step S102). The data may be transmitted by a known serial transfer method, or by a parallel transmission method if there is a margin in connection between the microcontroller 701 and the PWM controller 703. In order to cause the PWM controller 703 to store the data, the microcontroller 701 first makes a latch signal Latch an H level, and then an L level (step S103). In response to the fall of the Latch signal, a signal is output from the PWM controller 703.

Figure 22:
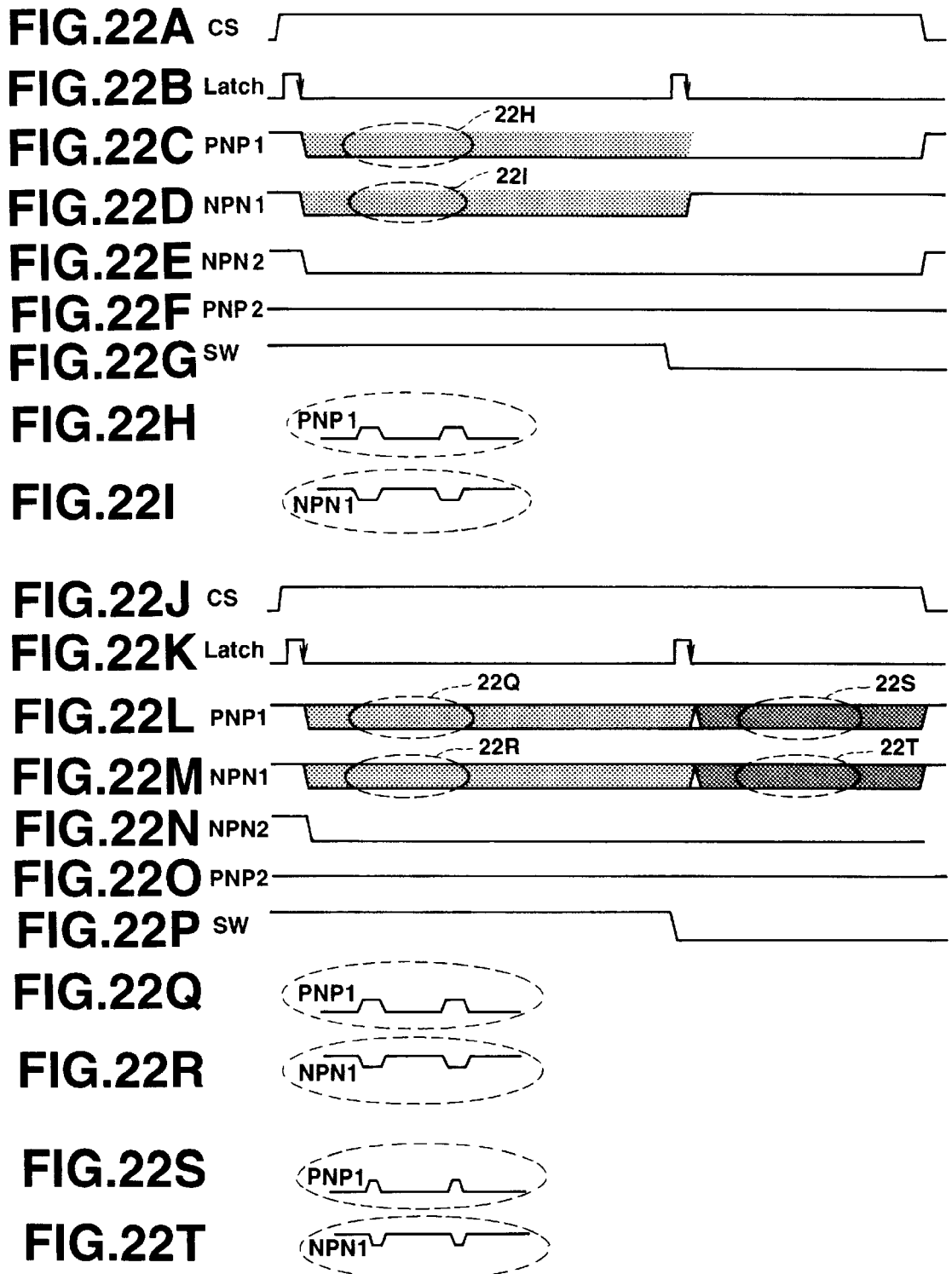
FIGS. 22A–22I and 22J–22T are timing charts illustrating output signals from a PWM controller shown in FIG. 21 with FIGS. 22H, 22I, 22Q, 22S, and 22T being enlarged views of FIGS. 22C, 22D, 22L, 22M, 22L, and 22M, respectively.

FIGS. 22A–22I and 22j–22t schematically illustrate output signals from the PWM controller 703. In FIGS. 22B and 22E, after the fall of the Latch signal (FIG. 22B), the NPN2 terminal assumes an L level (FIG. 22E). This signal turns on the NPN transistor 707 via the inverter 709 shown in FIG. 21. The PNP1 and NPN1 terminals alternately assume an L level within a predetermined period (as schematically illustrated by the shaded portions of FIGS. 22C and 22D, and in enlarged views in FIGS. 22H and 22I), whereby the PNP transistor 704 and the NPN transistor 706 are alternately turned on. The amount of power supply to the first motor 36 is controlled by the ratio of the time when the PNP1 terminal assumes an L level during the predetermined period (FIGS. 22C and 22H). Thus, the first motor 36 rotates via the PWM controller 703, to move the cover 2 of the cartridge-loading chamber and the armature 130.

Figure 25:
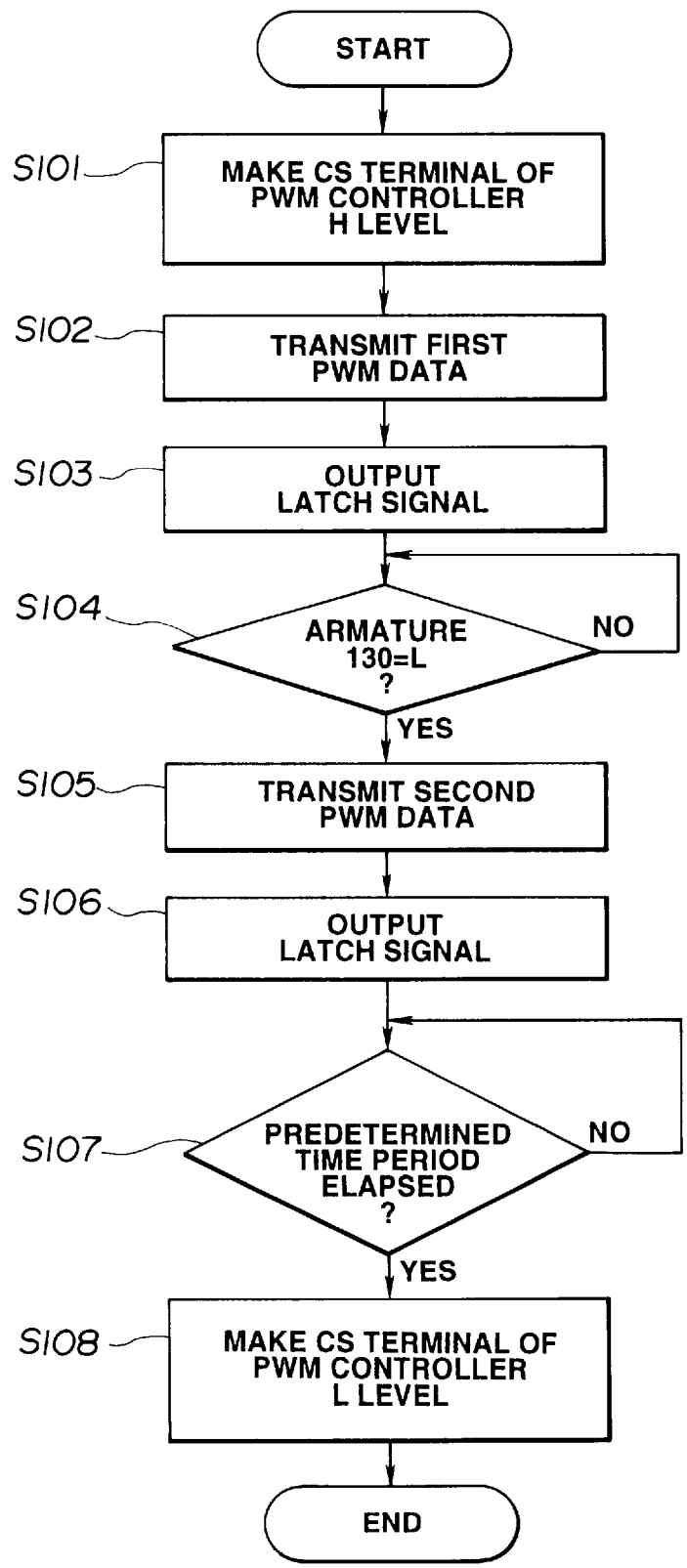
FIG. 25 is a flowchart illustrating the operation of the circuit shown in FIG. 21.

As described above, the armature 130 simultaneously contacts the pattern 131b (see, e.g., signal SW in FIG. 22G at an L level) when the cover 2 completely covers the entrance 10 (step S104 in FIG. 25). When the microcontroller 701 has detected the contact, it retransfers data to the PWM controller 703 so that the ratio of the time when the PNP1 terminal assumes an L level becomes 100% (step S105 in FIG. 25; FIG. 22C), and makes the Latch signal an H level and then an L level (step S106 in FIG. 25; FIG. 22B). In response to the fall of the Latch signal, the output signal NPNL from the PWM controller 703 thereafter always assumes an H level (FIG. 22D). As a result, the NPN transistor 706 is turned off via the inverter 708, and the first motor 36 enters into a so-called full-power-supply state. After the cover 2 has moved for a sufficient amount of time (step S107), the microcontroller 701 returns the selection signal CS for the PWM controller 703 to an L level (step S108 in FIG. 25; FIG. 22A)), and the power supply to the first motor 36 is completed. FIG. 2F schematically depicts the PNP2 signal.

While FIGS. 22A–22I illustrate a case of switching power supply to the first motor 36 to full power supply, FIGS. 22J–22T illustrate a case of switching power supply to the first motor 36 to second pulse-width modulation. In the case of FIGS. 22P and 22L, after the armature 130 has changed to an L level (see,, e.g., signal SW in FIG. 22P), the ratio of the time when the terminal PNP1 assumes an L level is increased (as illustrated, e.g., in the rightmost shaded portion in FIG. 22L, and in FIG. 22s; in comparison to the leftmost shaded region in FIG. 22L, and in FIG. 22Q). As in this case, power supply to the first motor 36 is not necessarily switched to full power supply, but may be switched to a second amount of power supply so as to provide a desired amount of power supply.

FIGS. 22J, 22K, 22M, 22N, and 20O respectively schematically illustrate signals CS, Latch, NPN1, NPN2, and PNP2, each of which operates in the manner discussed above with respect to FIGS. 22A, 22B, 22D, 22E, and 22F, respectively. FIGS. 22M, 22R, and 22T schematically illustrate the NPNL signal, an enlarged view of the leftmost shaded portion of FIG. 22M, and an enlarged view of the rightmost shaded portion of FIG. 27D, respectively. The NPN1 signal in FIGS. 22M, 22R, and 22T alternately assumes an L level with signal PNP1 of FIGS. 22L, 22Q, and 22S, respectively.

Figure 23:
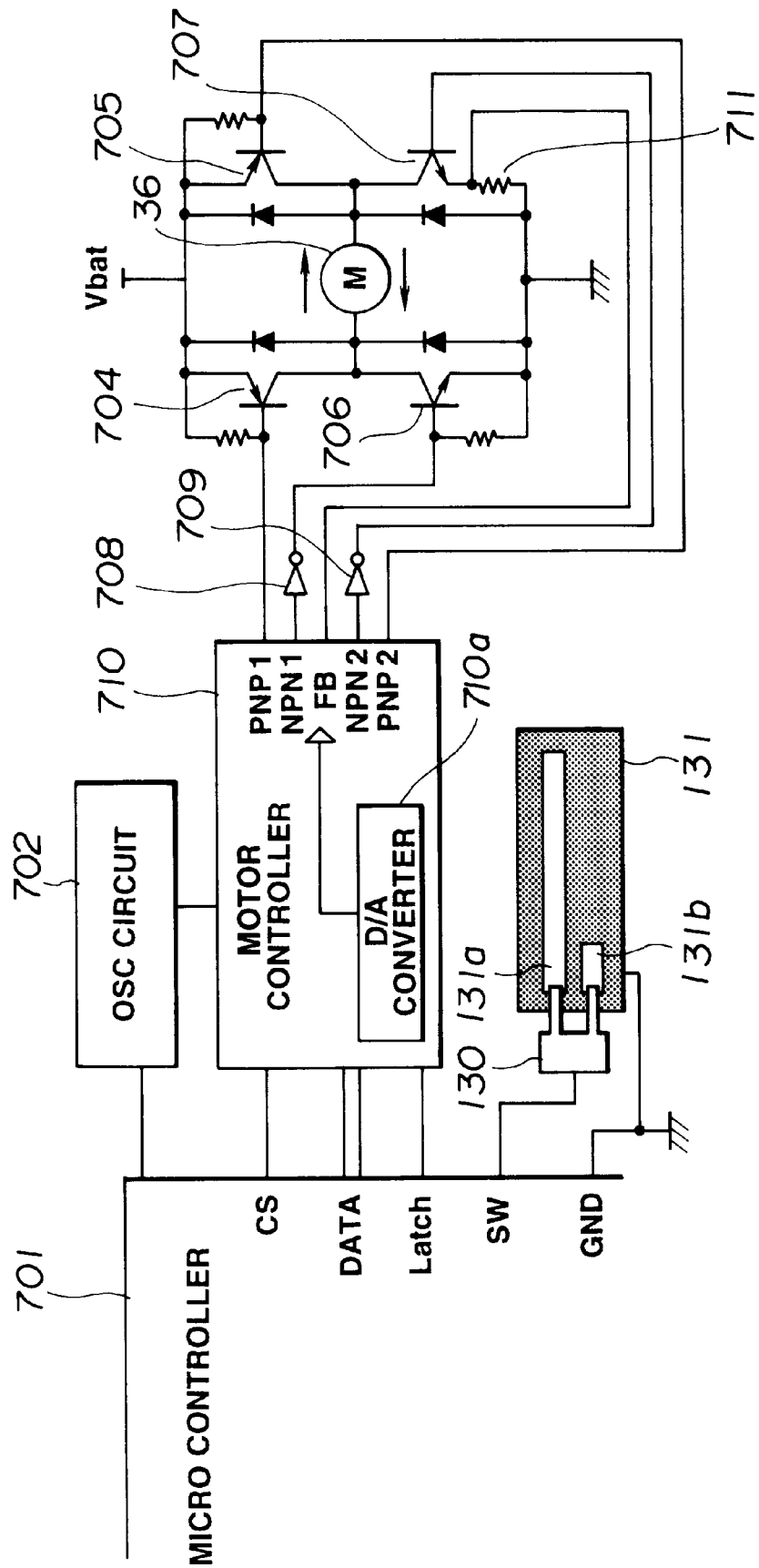
FIG. 23 is a diagram illustrating another control circuit of the third embodiment.
Figure 24:
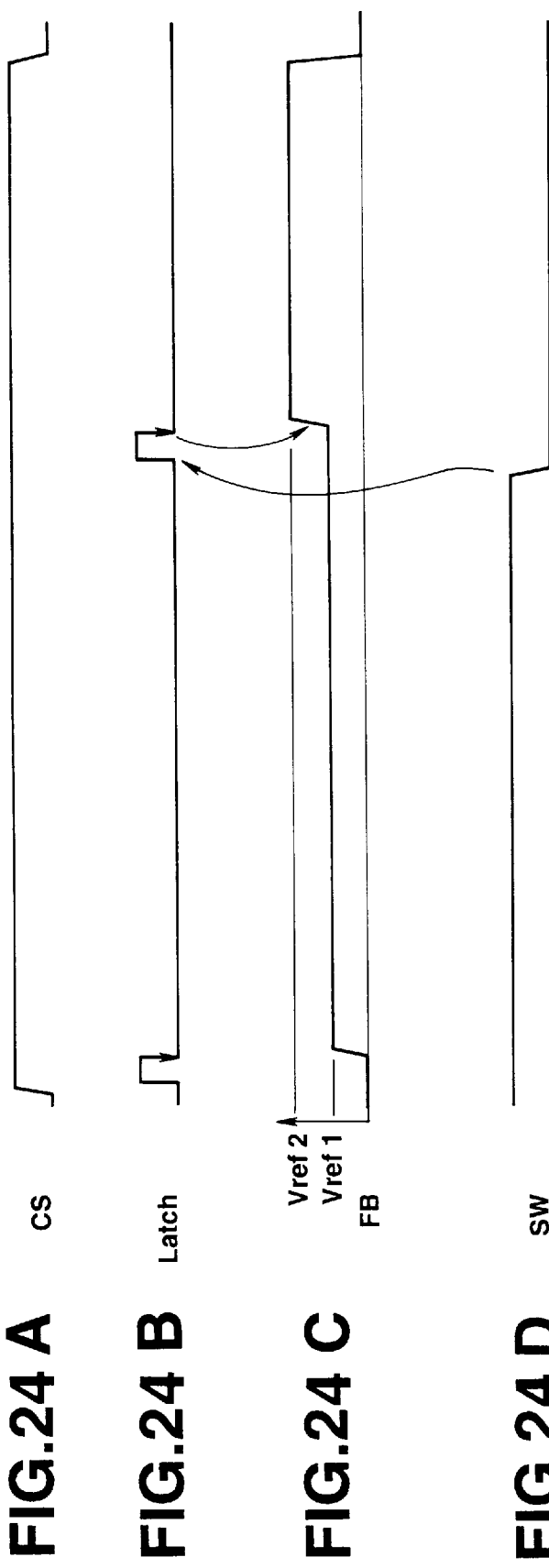
FIGS. 24A–24D are timing charts illustrating output signals from the circuitry shown in FIG. 23.
Figure 26:
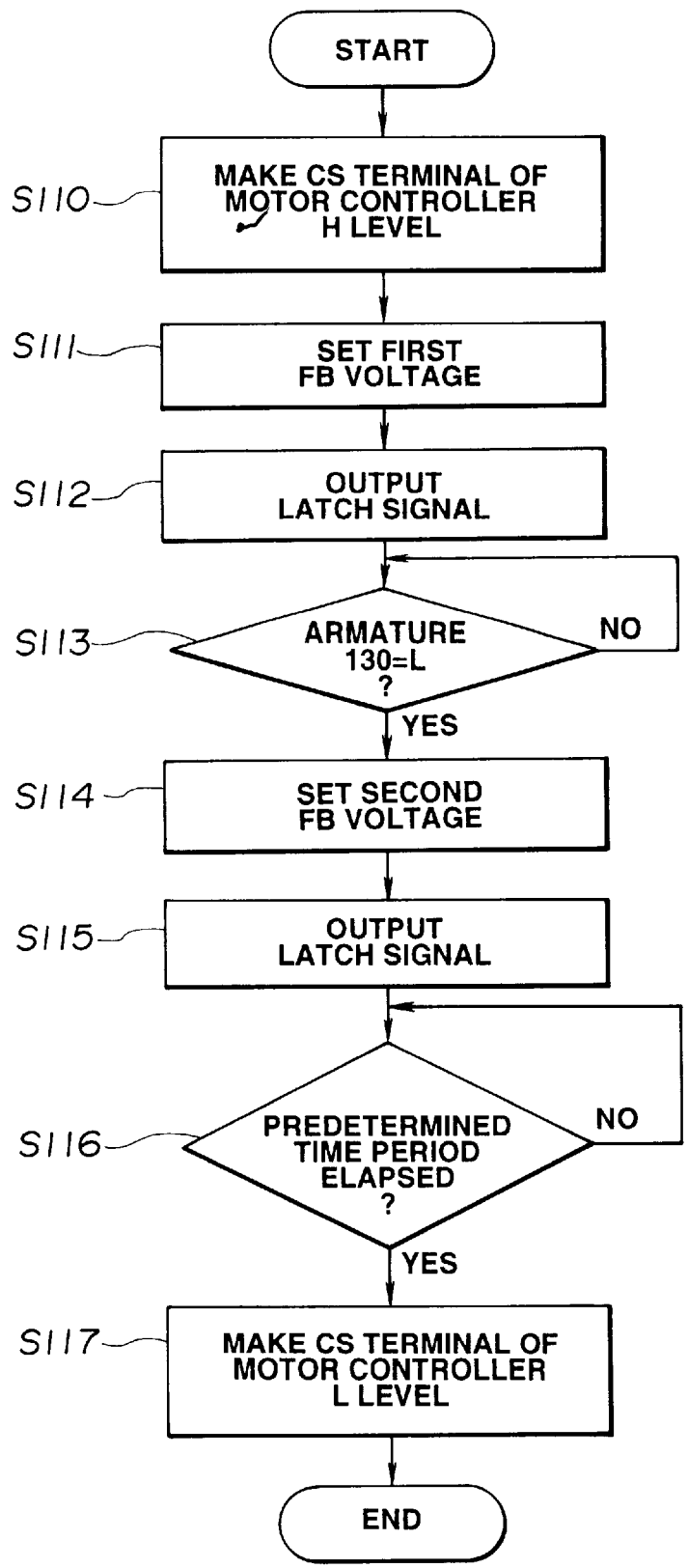
FIG. 26 is a flowchart illustrating the operation of the circuit shown in FIG. 23.

In the case of FIGS. 22A–22I and 22J–22T, switching of the amount of power supply by pulse-width modulation is performed using the PWM controller. FIG. 23 illustrates a block diagram of circuitry in which the same effect as in the case of FIGS. 22A–22I and 22J–22T is obtained by using means for controlling the amount of supplied current. FIG. 26 is a flowchart illustrating the sequence of the control. In FIG. 23, a motor controller 710 incorporates a digital-to-analog (D/A) converter 710a, and changes the set voltage FB of a feedback resistor 711, connected to the emitter of the NPN transistor 707, via the D/A converter 710a in accordance with a selection signal CS (FIG. 24A) and a data bus DATA from the microcontroller 701. The NPN transistor 707 is controlled so that the set voltage FB equals the detected voltage of the feedback resistor 711. First, in step S110, the selection signal CS (FIG. 24A) for the motor controller 710 is made an H level. Thereafter, as shown in FIGS. 24A–24D, the microcontroller 701, in cooperation with motor controller 710, sets the voltage FB (FIG. 24C) to a first level $V_{ref1}$ while the pattern switch by the armature 130 assumes an H level (step S111 in FIG. 26; signal SW in FIG. 24D), transmits a Latch signal (step S112 in FIG. 26; FIG. 24B), and rotates the first motor 36 with a first supply current corresponding to the voltage. When the cover 2 of the cartridge-loading chamber has been completely closed and the microcontroller 710 has detected that the pattern switch by the armature 130 has changed to an L level (step S113 in FIG. 26; signal SW in FIG. 24D), the microcontroller 701, in cooperation with motor controller 710, sets the voltage FB to a second level $V_{ref2}$ (step S114 in FIG. 26;

FIG. 24C), transmits a Latch signal (step S115 in FIG. 26; FIG. 24B), and rotates the first motor 36 with a second supply current corresponding to the voltage, so that the supply current is increased. After the cover 2 of the cartridge-loading chamber has moved for a sufficient amount of time (step S116), the microcontroller 701 returns the selection signal CS for the motor controller 710 to an L level (step S117), to terminate power supply to the first motor 36. The amount of supply current to the motor may be switched in the above-described manner.

According to the above-described third embodiment, in the camera in which the light-blocking door of the cartridge is opened/closed in a manner linked with the sliding movement of the cover of the cartridge-loading chamber which is electrically driven, power supply to the motor for the cover is controlled so as to operate with a weak force and a slow speed within a range between the completely opened state to the completely closed state during the sliding movement, and to operate with a strong force and a high speed within a range of overstroke movement after the completely closed state. Hence, it is possible to assuredly perform the opening/closing operations of the light-blocking door of the cartridge, which requires a strong force, with a strong force, and also to prevent accidents such as, for example, wherein a finger is strongly pinched by the cover of the cartridge-loading chamber.

The present invention is not limited to the above-described embodiments. For example, the configuration of linkage between the opening/closing operations of the cover of the cartridge-loading chamber and the opening/closing operations of the light-blocking door of the cartridge may differ from the configurations shown in the above-described embodiments. The driving force for opening/closing the cover of the cartridge-loading chamber and the driving force for opening/closing the light-blocking door of the cartridge may be changed by changing the transmission system of the driving force instead of changing the amount of power supply to the motor as in the above-described embodiments.

Driving means for loading and unloading the cartridge may comprise any means other than the above-described roller.

The present invention may, of course, be applied by using any other electric driving means, or any other driving force provided by a spring, a manual operation or the like, instead of using the driving force of the motor.

The present invention may also be applied to a camera which uses a cartridge having a movable light-blocking door or the like other than the one described in the embodiments.

The present invention may also be applied to any image recording media other than a film.

The present invention may also be applied to a camera which uses a cartridge other than the one described in the embodiments, a cartridge which uses an image recording medium other than a film, a cartridge of any other kind, or any loading member other than a cartridge.

While the present invention has been described with respect to what is presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

The individual components shown in schematic or block form in the drawings are all well known in the camera arts and their specific construction and operation are not critical to the operation or the best mode for carrying out the invention.

The present invention may also be applied by combining the above-described embodiments and technical elements thereof whenever necessary.

In the present invention) the entirety or a portion of the configuration of a claim or an embodiment may comprise a single apparatus, or be combined with another apparatus, or comprise a component which constitutes an apparatus.

The present invention may be applied to any of various kinds of cameras, such as a single-lens reflex camera, a lens-shutter camera, a video camera or the like, any optical apparatus other than a camera, any other apparatus, an apparatus applied to one of such apparatuses, or a component which constitutes one of such apparatuses.

What is claimed is:

1. An apparatus adapted to use an image recording medium cartridge having a cover that opens to allow an image recording medium to exit from or fully withdraw into an interior chamber of the cartridge, said apparatus comprising:

a cartridge chamber cover; and a driving device including at least one electrical device, a single electrical device of said at least one electrical device being operable to close said cartridge chamber cover and then open the cover of the cartridge.

2. An apparatus according to claim 1, wherein the image recording medium comprises a film.

3. An apparatus according to claim 1, wherein the cover of the cartridge comprises means for blocking light.

4. An apparatus according to claim 1, wherein said cartridge chamber cover comprises means for performing a sliding operation.

5. An apparatus according to claim 1, further comprising:

an operation device which operates on the cartridge to perform at least one of loading and unloading of the cartridge relative to said apparatus, said operation device comprising means for reducing load upon the cartridge in a state in which the loading of the cartridge has been completed.

6. An apparatus according to claim 1, wherein said single electrical device opens said cartridge chamber cover after closing the cover of the cartridge.

7. An apparatus according to claim 1, further comprising:

a second driving device which performs at least one of loading and unloading of the cartridge relative to said apparatus.

8. An apparatus according to claim 1, wherein said apparatus comprises a camera.

9. An apparatus according to claim 1, wherein said driving device comprises moving means for performing at least one of closing said cartridge chamber cover while moving a predetermined interval and opening the cover of the cartridge after moving the predetermined interval, and closing the cover of the cartridge while moving a predetermined interval and opening said cartridge chamber cover after moving the predetermined interval.

10. An apparatus according to claim 9, wherein said moving means comprises a cam portion.

11. A camera according to claim 9, wherein said driving device comprises means for performing the movement of said moving means for the predetermined interval and a subsequent operation.

12. An apparatus according to claim 1, further comprising:

changing means for changing a driving state for said cartridge chamber cover by said driving device, and a driving state for the cover of the cartridge by said driving device.

13. An apparatus according to claim 12, wherein said changing means comprises means for making a driving force for the cover of the cartridge by said driving device greater than a driving force for said cartridge chamber cover by said driving device.

14. An apparatus according to claim 12, wherein said changing means comprises means for making a driving speed for the cover of the cartridge by said driving device higher than a driving speed for said cartridge chamber cover by said driving device.

15. An apparatus according to claim 12, wherein said changing means comprises means for changing an amount of power supply to said driving device.

16. An apparatus according to claim 12, wherein said changing means comprises means for changing a power-supply duty ratio of said driving device.

17. An apparatus adapted to use an image recording medium cartridge having a cover that opens to allow an image recording medium to exit from or fully withdraw into an interior chamber of the cartridge, said apparatus comprising:
   a cartridge chamber cover; and
   a driving device including at least one motor, a single motor of said at least one motor being operable to close said cartridge chamber cover and then open the cover of the cartridge.

18. An apparatus according to claim 17, wherein the image recording medium comprises a film.

19. A camera according to claim 17, wherein the cover of the cartridge comprises means for blocking light.

20. An apparatus according to claim 17, wherein said cartridge chamber cover comprises means for performing a sliding operation.

21. An apparatus according to claim 17, further comprising:
   an operation device which operates on the cartridge to perform at least one of loading and unloading of the cartridge relative to said apparatus, said operation device comprising means for reducing load upon the cartridge in a state in which the loading of the cartridge has been completed.

22. An apparatus according to claim 17, wherein said single motor opens said cartridge chamber cover after closing the cover of the cartridge.

23. An apparatus according to claim 17, further comprising:
   a second driving device which performs at least one of loading and unloading of the cartridge relative to said apparatus.

24. An apparatus according to claim 17, wherein said apparatus comprises a camera.

25. An apparatus according to claim 17, wherein said driving device comprises moving means for performing at least one of closing said cartridge chamber cover while moving a predetermined interval and opening the cover of the cartridge after moving the predetermined interval, and closing the cover of the cartridge while moving a predetermined interval and opening said cartridge chamber cover after moving the predetermined interval.

26. An apparatus according to claim 25, wherein said moving means comprises a cam portion.

27. A camera according to claim 25, wherein said driving device comprises means for performing the movement of said moving means for the predetermined interval and a subsequent operation.

28. An apparatus according to claim 17, further comprising:
   changing means for changing a driving state for said cartridge chamber cover by said driving device, and a driving state for the cover of the cartridge by said driving device.

29. An apparatus according to claim 28, wherein said changing means comprises means for making a driving force for the cover of the cartridge by said driving device greater than a driving force for said cartridge chamber cover by said driving device.

30. An apparatus according to claim 28, wherein said changing means comprises means for making a driving speed for the cover of the cartridge by said driving device higher than a driving speed for said cartridge chamber cover by said driving device.

31. An apparatus according to claim 28, wherein said changing means comprises means for changing an amount of power supply to said driving device.

32. An apparatus according to claim 28, wherein said changing means comprises means for changing a power-supply duty ratio of said driving device.

33. An apparatus adapted to use an image recording medium cartridge having a light shield portion movable between an open shield position and a closed shield position, an image recording medium being exited from and withdrawn into the cartridge past said light shield, said apparatus comprising:
   a cartridge chamber cover; and
   a driving device including at least one electrical device, a single electrical device of said at least one electrical device being operable to close said cartridge chamber cover and then open the light shield portion.

34. An apparatus according to claim 33, wherein the image recording medium comprises a film.

35. An apparatus according to claim 33, further comprising:
   changing means for changing a driving state for said cartridge chamber cover by said driving device, and a driving state for the light shield portion by said driving device.

36. An apparatus according to claim 33, wherein said apparatus comprises a camera.

37. An apparatus adapted to use an image recording medium cartridge having a light shield portion movable between an open shield position and a closed shield position, an image recording medium being exited from and withdrawn into the cartridge past said light shield, said apparatus comprising:
   a cartridge chamber cover; and
   a driving device including at least one motor, a single motor of said at least one motor being operable to close said cartridge chamber cover and then open the light shield portion.

38. An apparatus according to claim 37, wherein the image recording medium comprises a film.

39. An apparatus according to claim 37, further comprising:
   changing means for changing a driving state for said cartridge chamber cover by said driving device, and a driving state for the light shield portion by said driving device.

40. An apparatus according to claim 37, wherein said apparatus comprises a camera.

41. An apparatus adapted to use an image recording medium cartridge having a cover that opens to allow an image recording medium to exit from or fully withdraw into an interior chamber of the cartridge, said apparatus comprising;
   a cartridge chamber cover; and
   a driving device including at least one electrical device, a single electrical device of said at least one electrical device being operable to close the cover of the cartridge and then to open said chamber cover.

42. An apparatus according to claim 41, wherein the image recording medium comprises a film.

43. An apparatus according to claim 41, wherein the cover of the cartridge comprises means for blocking light.

44. An apparatus according to claim 41, wherein said cartridge chamber cover comprises means for performing a sliding operation.

45. An apparatus according to claim 41, further comprising:
   an operation device which operates on the cartridge to perform at least one of loading and unloading of the cartridge relative to said apparatus, said operation device comprising means for reducing load upon the cartridge in a state in which the loading of the cartridge has been completed.

46. An apparatus according to claim 41, further comprising:
   a second driving device which performs at least one of loading and unloading of the cartridge relative to said apparatus.

47. An apparatus according to claim 41, wherein said apparatus comprises a camera.

48. An apparatus according to claim 41, wherein said driving device comprises moving means for performing at least one of opening said cartridge chamber cover while moving a predetermined interval and closing the cover of the cartridge after moving the predetermined interval, and opening the cover of the cartridge while moving a predetermined interval and closing said cartridge chamber cover after moving the predetermined interval.

49. An apparatus according to claim 48, wherein said moving means comprises a cam portion.

50. A camera according to claim 48, wherein said driving device comprises means for performing the movement of said moving means for the predetermined interval and a subsequent operation.

51. An apparatus according to claim 41, further comprising:
   changing means for changing a driving state for said cartridge chamber cover by said driving device, and a driving state for the cover of the cartridge by said driving device.

52. An apparatus according to claim 51, wherein said changing means comprises means for making a driving force for the cover of the cartridge by said driving device greater than a driving force for said cartridge chamber cover by said driving device.

53. An apparatus according to claim 51, wherein said changing means comprises means for making a driving speed for the cover of the cartridge by said driving device higher than a driving speed for said cartridge chamber cover by said driving device.

54. An apparatus according to claim 51, wherein said changing means comprises means for changing an amount of power supply to said driving device.

55. An apparatus according to claim 51, wherein said changing means comprises means for changing a power-supply duty ratio of said driving device.

56. An apparatus adapted to use an image recording medium cartridge having a cover that opens to allow an image recording medium to exit from or fully withdraw into an interior chamber of the cartridge, said apparatus comprising:
   a cartridge chamber cover; and
   a driving device including at least one motor, a single motor of said at least one motor being operable to close the cover of the cartridge and then to open said chamber cover.

57. An apparatus according to claim 56, wherein the image recording medium comprises a film.

58. An apparatus according to claim 56, wherein the cover of the cartridge comprises means for blocking light.

59. An apparatus according to claim 56, wherein said cartridge chamber cover comprises means for performing a sliding operation.

60. An apparatus according to claim 56, further comprising:
   an operation device which operates on the cartridge to perform at least one of loading and unloading of the cartridge relative to said apparatus, said operation device comprising means for reducing load upon the cartridge in a state in which the loading of the cartridge has been completed.

61. An apparatus according to claim 56, further comprising:
   a second driving device which performs at least one of loading and unloading of the cartridge relative to said apparatus.

62. An apparatus according to claim 56, wherein said apparatus comprises a camera.

63. An apparatus according to claim 56, wherein said driving device comprises moving means for performing at least one of opening said cartridge chamber cover while moving a predetermined interval and closing the cover of the cartridge after moving the predetermined interval, and opening the cover of the cartridge while moving a predetermined interval and closing said cartridge chamber cover after moving the predetermined interval.

64. An apparatus according to claim 63, wherein said moving means comprises a cam portion.

65. A camera according to claim 63, wherein said driving device comprises means for performing the movement of said moving means for the predetermined interval and a subsequent operation.

66. An apparatus according to claim 56, further comprising:
   changing means for changing a driving state for said cartridge chamber cover by said driving device, and a driving state for the cover of the cartridge by said driving device.

67. An apparatus according to claim 66, wherein said changing means comprises means for making a driving force for the cover of the cartridge by said driving device greater than a driving force for said cartridge chamber cover by said driving device.

68. An apparatus according to claim 66, wherein said changing means comprises means for making a driving speed for the cover of the cartridge by said driving device higher than a driving speed for said cartridge chamber cover by said driving device.

69. An apparatus according to claim 66, wherein said changing means comprises means for changing an amount of power supply to said driving device.

70. An apparatus according to claim 66, wherein said changing means comprises means for changing a power-supply duty ratio of said driving device.

71. An apparatus adapted to use an image recording medium cartridge having a light shield portion movable between an open shield position and a closed shield position, an image recording medium being exited from and withdrawn into the cartridge past said light shield, said apparatus comprising:
- a cartridge chamber cover; and
- a driving device including at least one electrical device, a single electrical device of said at least one electrical device being operable to close the light shield portion and then to open said chamber cover.

72. An apparatus according to claim 71, wherein the image recording medium comprises a film.

73. An apparatus according to claim 71, further comprising:
- changing means for changing a driving state for said cartridge chamber cover by said driving device, and a driving state for the light shield portion by said driving device.

74. An apparatus according to claim 71, wherein said apparatus comprises a camera.

75. An apparatus adapted to use an image recording medium cartridge having a light shield portion movable between an open shield position and a closed shield position, an image recording medium being exited from and withdrawn into the cartridge past said light shield, said apparatus comprising;
- a cartridge chamber cover; and
- a driving device including at least one motor, a single motor of said at least one motor being operable to close the light shield portion and then to open said chamber cover.

76. An apparatus according to claim 75, wherein the image recording medium comprises a film.

77. An apparatus according to claim 75, further comprising:
- changing means for changing a driving state for said cartridge chamber cover by said driving device, and a driving state for the light shield portion by said driving device.

78. An apparatus according to claim 75, wherein said apparatus comprises a camera.

* * * * *

UNITED STATES PATENT AND TRADEMARK OFFICE
CERTIFICATE OF CORRECTION

PATENT NO. : 6,055,383
DATED : April 25, 2000
INVENTOR(S) : YUKIO OGAWA, ET AL.

It is certified that error appears in the above-identified patent and that said Letters Patent is hereby corrected as shown below:

At [56] References Cited

"480735 of 1992 Japan." should read
--4-80735 3/1992 Japan.--

"Dassuno" should read --Dassero--.

At [57] ABSTRACT

Line 1, "record image" should read --recording--.

Column 1

Line 21, "a" should read --an--.
Line 25, "catridge-loading" should read
--cartridge-loading--.

Column 2

Line 45, "sheild" should read --shield--.
Line 55, "sheild" should read --shield--.

UNITED STATES PATENT AND TRADEMARK OFFICE
CERTIFICATE OF CORRECTION

PATENT NO.  : 6,055,383
DATED       : April 25, 2000
INVENTOR(S) : YUKIO OGAWA, ET AL.

It is certified that error appears in the above-identified patent and that said Letters Patent is hereby corrected as shown below:

Column 3

Line 21, "sheild" should read --shield--.

Column 6

Line 22, "directions" should read --direction--.
    Line 37, "FIG." should read --FIG. 5).--.

Column 8

Line 6, "state,," should read --state,--.
    Line 48, "11" should read --1--.

Column 9

Line 66, "states" should read --state,--.

Column 10

Line 17, "chamber)" should read --chamber,--.
    Line 33, "cartridge 1" should read --cartridge 1--.

UNITED STATES PATENT AND TRADEMARK OFFICE
CERTIFICATE OF CORRECTION

PATENT NO. : 6,055,383
DATED : April 25, 2000
INVENTOR(S) : YUKIO OGAWA, ET AL.

Page 3 of 4

It is certified that error appears in the above-identified patent and that said Letters Patent is hereby corrected as shown below:

Column 12

Line 3, "NPNL" should read --NPN1--.
    Line 10, "22A))," should read --22A),--.

Column 13

Line 57, "is" should read --are--.

Column 14

Line 7, "invention)" should read --invention,--.

UNITED STATES PATENT AND TRADEMARK OFFICE
CERTIFICATE OF CORRECTION

PATENT NO. : 6,055,383
DATED : April 25, 2000
INVENTOR(S) : YUKIO OGAWA, ET AL.

It is certified that error appears in the above-identified patent and that said Letters Patent is hereby corrected as shown below:

Column 17

Line 5, "prising;" should read --prising:--.

Column 20

Line 4, "comprising;" should read --comprising:--.

Signed and Sealed this

Tenth Day of April, 2001

Attest:

NICHOLAS P. GODICI

*Attesting Officer*　　*Acting Director of the United States Patent and Trademark Office*